United States Patent
Matano

(10) Patent No.: US 8,770,326 B2
(45) Date of Patent: Jul. 8, 2014

(54) VEHICLE COMPONENT MOUNTING ARRANGEMENT

(75) Inventor: Shinichi Matano, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 13/264,049

(22) PCT Filed: Apr. 10, 2010

(86) PCT No.: PCT/IB2010/000792
§ 371 (c)(1),
(2), (4) Date: Oct. 12, 2011

(87) PCT Pub. No.: WO2010/119320
PCT Pub. Date: Oct. 21, 2010

(65) Prior Publication Data
US 2012/0055721 A1   Mar. 8, 2012

(30) Foreign Application Priority Data

Apr. 15, 2009 (JP) ................................. 2009-098779
Jul. 17, 2009 (JP) ................................. 2009-168966

(51) Int. Cl.
*B60K 1/00* (2006.01)
(52) U.S. Cl.
USPC ...................................................... 180/65.1
(58) Field of Classification Search
None
See application file for complete search history.

(56) References Cited

U.S. PATENT DOCUMENTS

| | | | |
|---|---|---|---|
| 6,205,379 B1 * | 3/2001 | Morisawa et al. | 701/22 |
| 6,460,642 B1 * | 10/2002 | Hirano | 180/65.1 |
| 6,964,822 B2 * | 11/2005 | Kobayashi et al. | 429/431 |
| 7,146,958 B2 * | 12/2006 | Asakawa et al. | 123/179.16 |
| 7,438,984 B2 * | 10/2008 | Aoyagi et al. | 429/430 |
| 7,484,581 B2 * | 2/2009 | Yamafuji | 180/65.1 |
| 7,810,596 B2 | 10/2010 | Tsuchiya | |
| 2003/0034186 A1 | 2/2003 | Morita et al. | |

(Continued)

FOREIGN PATENT DOCUMENTS

| | | |
|---|---|---|
| CN | 101090838 B | 5/2010 |
| JP | 06-197417 A | 7/1994 |

(Continued)

OTHER PUBLICATIONS

An English translation of the Japanese Office Action of corresponding Japanese Application No. JP 2009-168966, dated Jan. 5, 2012, mailed Jan. 10, 2012.

(Continued)

*Primary Examiner* — Jeffrey J Restifo
*Assistant Examiner* — Erez Gurari
(74) *Attorney, Agent, or Firm* — Global IP Counselors, LLP

(57) ABSTRACT

A vehicle component mounting arrangement is provided with a motor, an inverter, a converter and a drive power supply battery. The motor serves as a vehicle drive source. The inverter is electrically connected to the motor to supply a drive current to the motor. The inverter is vertically arranged above the motor in a vertical direction of a vehicle. The converter is arranged inside a motor room of a vehicle. The drive power supply battery is electrically connected to the converter with an electrical harness. The drive power supply battery is arranged outside the motor room on a side of the motor room that is closer to a vehicle cabin. The converter is further arranged between the inverter and the drive power supply battery with respect to a longitudinal direction of the vehicle.

12 Claims, 15 Drawing Sheets

(56) References Cited

U.S. PATENT DOCUMENTS

| | | | |
|---|---|---|---|
| 2007/0119637 A1* | 5/2007 | Yajima et al. | 180/65.1 |
| 2010/0116571 A1* | 5/2010 | Suzuki | 180/65.25 |
| 2010/0172772 A1* | 7/2010 | Watanabe et al. | 417/410.1 |
| 2011/0162899 A1* | 7/2011 | Blade | 180/65.1 |
| 2012/0031689 A1* | 2/2012 | Kanno | 180/65.1 |
| 2012/0031690 A1* | 2/2012 | Kanno | 180/65.1 |
| 2012/0055721 A1* | 3/2012 | Matano | 180/65.1 |

FOREIGN PATENT DOCUMENTS

| | | |
|---|---|---|
| JP | 06-199137 A | 7/1994 |
| JP | 07-156826 A | 6/1995 |
| JP | 09-277840 A | 10/1997 |
| JP | 11-180162 A | 7/1999 |
| JP | 2002-247712 A | 8/2002 |
| JP | 2006-088871 A | 4/2006 |
| JP | 2008-081010 A | 4/2008 |
| JP | 2009-038920 | 2/2009 |
| JP | 2009-038920 A | 2/2009 |
| JP | 2010-260391 | 11/2010 |

OTHER PUBLICATIONS

A Written Opinion of the International Search Authority for International Application No. PCT/IB2010/000792, dated Jul. 27, 2010, mailed Aug. 3, 2010.

The extended European search report for the corresponding European patent application No. 10764153.2-1752 issued on Dec. 9, 2013.

English translation of the Chinese Office Action for the corresponding Chinese patent application No. 201080026624.0 issued on Oct. 24, 2013.

* cited by examiner

VEHICLE COMPONENT MOUNTING ARRANGEMENT

CROSS-REFERENCE TO RELATED APPLICATIONS

This application is a U.S. National stage of International Application No. PCT/IB2010/000792, filed Apr. 10, 2010, which claims priority to Japanese Patent Application Nos. 2009-098779, filed on Apr. 15, 2009 and 2009-168966, filed on Jul. 17, 2009. The entire disclosures of Japanese Patent Application Nos. 2009-098779 and 2009-168966 are hereby incorporated herein by reference.

BACKGROUND

1. Field of the Invention

The present invention relates to a vehicle component mounting arrangement for an electric vehicle. More particularly, the present invention relates to a vehicle component mounting arrangement having a connection between a converter and a drive power supply battery.

2. Background Information

Electric vehicles often include an electric motor, an inverter and a converter that are mounted in a motor room. One example of such an electric vehicle is disclosed in Japanese Laid-Open Patent Publication No. 7-156826. In the mounting arrangement of this publication, the motor, the inverter and the converter are vertically arranged in this sequence from bottom to top in the motor room with a drive power supply battery is installed below a cabin floor of the vehicle.

SUMMARY

It has been discovered that with the conventional structure presented in Japanese Laid-Open Patent Publication No. 7-156826, since the inverter and the converter are stacked above the motor, the position of the converter is far from the drive power supply battery and a harness used to connect the converter to the drive power supply battery needs to be long in a longitudinal direction of the vehicle.

In view of this above mentioned need for a long harness, one object is to provide a vehicle component mounting arrangement which enables the length of an electrical harness connecting a converter to a drive power supply battery to be shortened.

In order to achieve the aforementioned object, a vehicle component mounting arrangement is provided that mainly comprises a motor, an inverter, a converter and a drive power supply battery. The motor serves as a vehicle drive source. The inverter is electrically connected to the motor to supply a drive current to the motor. The inverter is vertically arranged above the motor in a vertical direction of a vehicle. The converter is arranged inside a motor room of a vehicle. The drive power supply battery is electrically connected to the converter with an electrical harness. The drive power supply battery is arranged outside the motor room on a side of the motor room that is closer to a vehicle cabin. The converter is further arranged between the inverter and the drive power supply battery with respect to a longitudinal direction of the vehicle.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
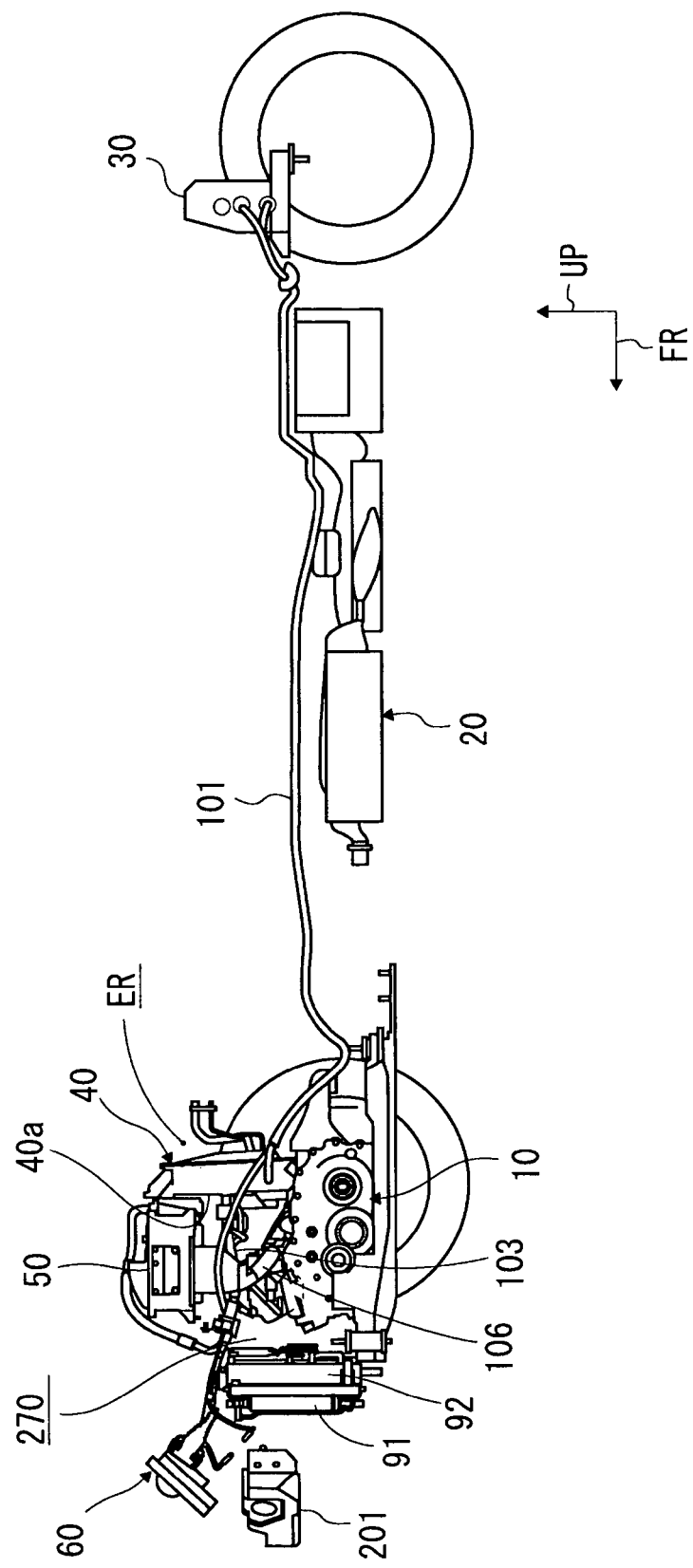
FIG. 1 is a full side elevational view of main parts of an electric vehicle component mounting arrangement for an electric vehicle in accordance with a first embodiment.
Figure 2:
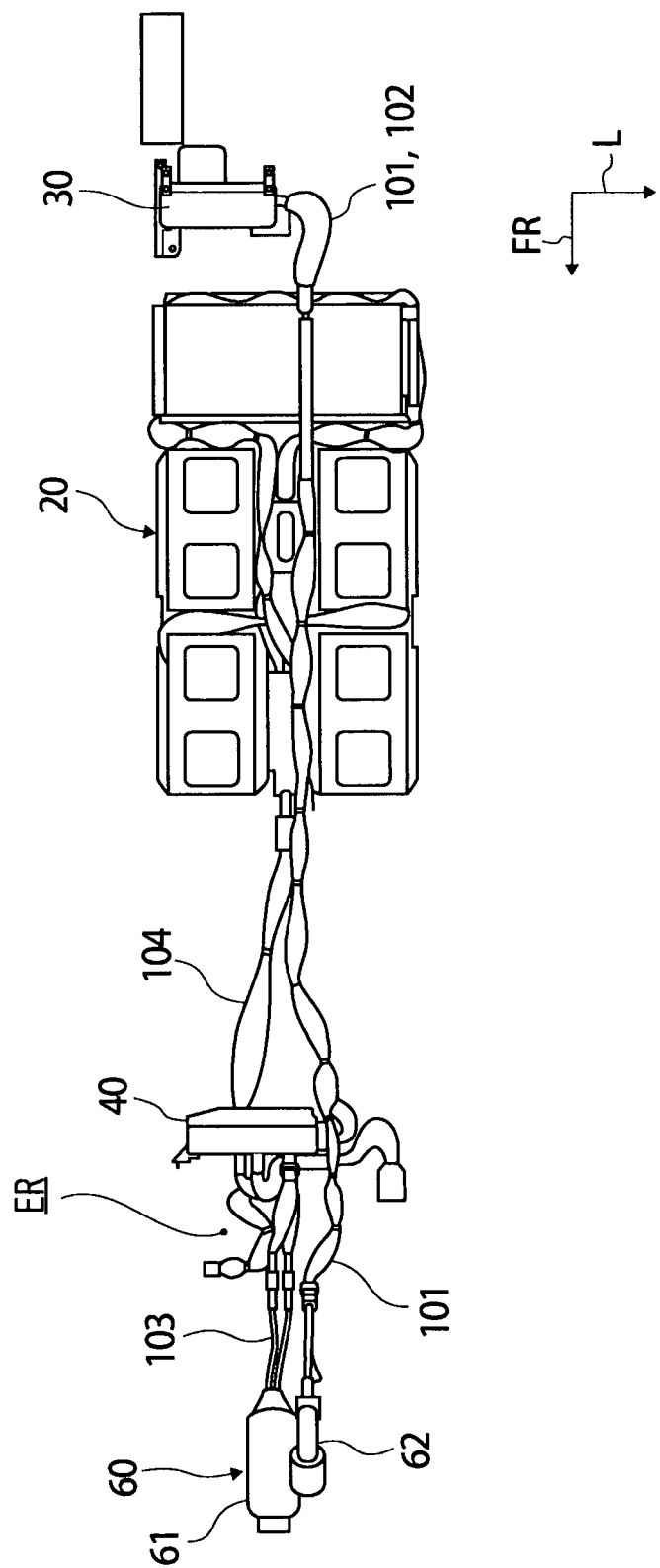
FIG. 2 is a full top plan view of the main parts of the electric vehicle component mounting arrangement illustrated in FIG. 1 in accordance with the first embodiment.

Referring initially to FIGS. 1 and 2, a portion of an electric vehicle is illustrated with an electric vehicle component mounting arrangement in accordance with a first embodiment. FIG. 1 is a side elevational view of main parts of the electric vehicle component mounting arrangement in accordance with the first embodiment. FIG. 2 is a top plan view of the main parts of the electric vehicle component mounting arrangement in accordance with the first embodiment. In the figures, an arrow FR indicates a frontward direction of the vehicle, an arrow UP indicates an upward direction of the vehicle, and an arrow L indicates a leftward direction of the vehicle.

As used herein to describe the embodiment(s), the following directional terms "forward", "rearward", "above", "downward", "vertical", "horizontal", "below" and "transverse" as well as any other similar directional terms refer to those directions of a vehicle on flat, level ground and equipped with the electric vehicle component mounting arrangement. Accordingly, these terms, as utilized to describe the present invention should be interpreted relative to a vehicle equipped with the electric vehicle component mounting arrangement on flat, level ground.

An overview of the electric vehicle component mounting arrangement in accordance with the first embodiment will now be explained with reference to FIGS. 1 and 2. As shown in FIGS. 1 and 2, the vehicle is equipped with a motor unit 10, a drive power supply battery 20, a charger 30, a converter 40, an inverter 50, and a pair of charging ports 60. Generally, the electric vehicle component mounting arrangement includes the motor unit 10, the inverter 50 and the converter 40, which are arranged in a motor room ER. The motor unit 10 serves as a drive source. The inverter 50 supplies a drive current to the motor unit 10.

Figure 3:
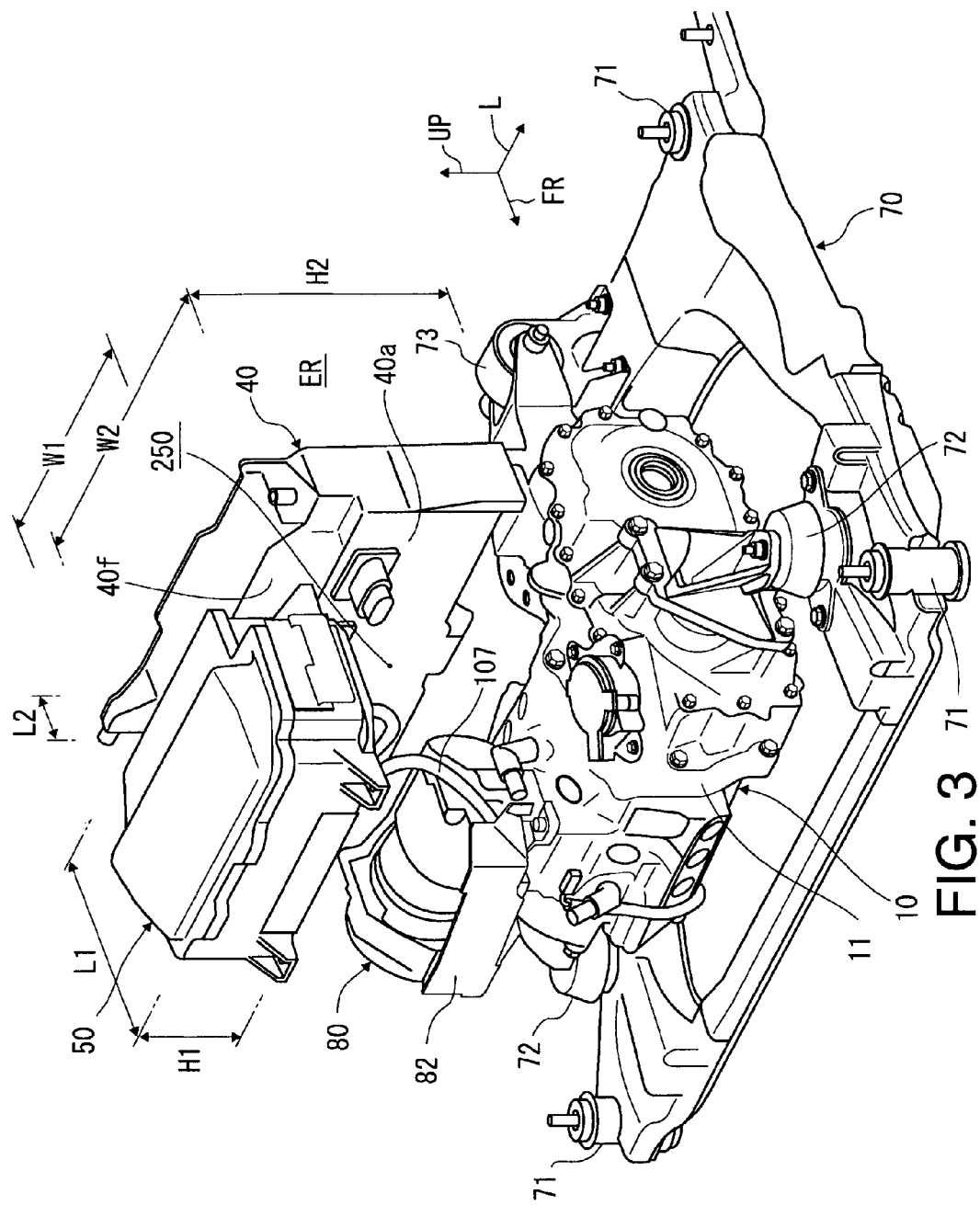
FIG. 3 is a top, front, left side perspective view of the arrangement of the main constituent features inside the motor room of the electric vehicle component mounting arrangement in accordance with the first embodiment.

As shown in FIG. 3, the inverter 50 is arranged above the motor unit 10 in a vertical direction of a vehicle such that a vertical space 250 exists directly in-between the inverter 50 and the motor unit 10. Also the inverter 50 is positioned horizontally outward with respect to the converter 40 in a longitudinal direction of the vehicle. In other words, the inverter 50 extends in the longitudinal vehicle direction from the converter 40 in a cantilever arrangement. The converter 40 extends in a vertical direction of the vehicle such that a portion of the converter 40 overlaps with the space 250 existing between the inverter 50 and the motor unit 10 as viewed in the longitudinal vehicle direction. A charging port 60 is provided in a position located horizontally outward with respect to the inverter 50 in a longitudinal direction of the vehicle and electrically connected to the converter 40 by a harness 103 arranged in the space 250.

Figure 5:
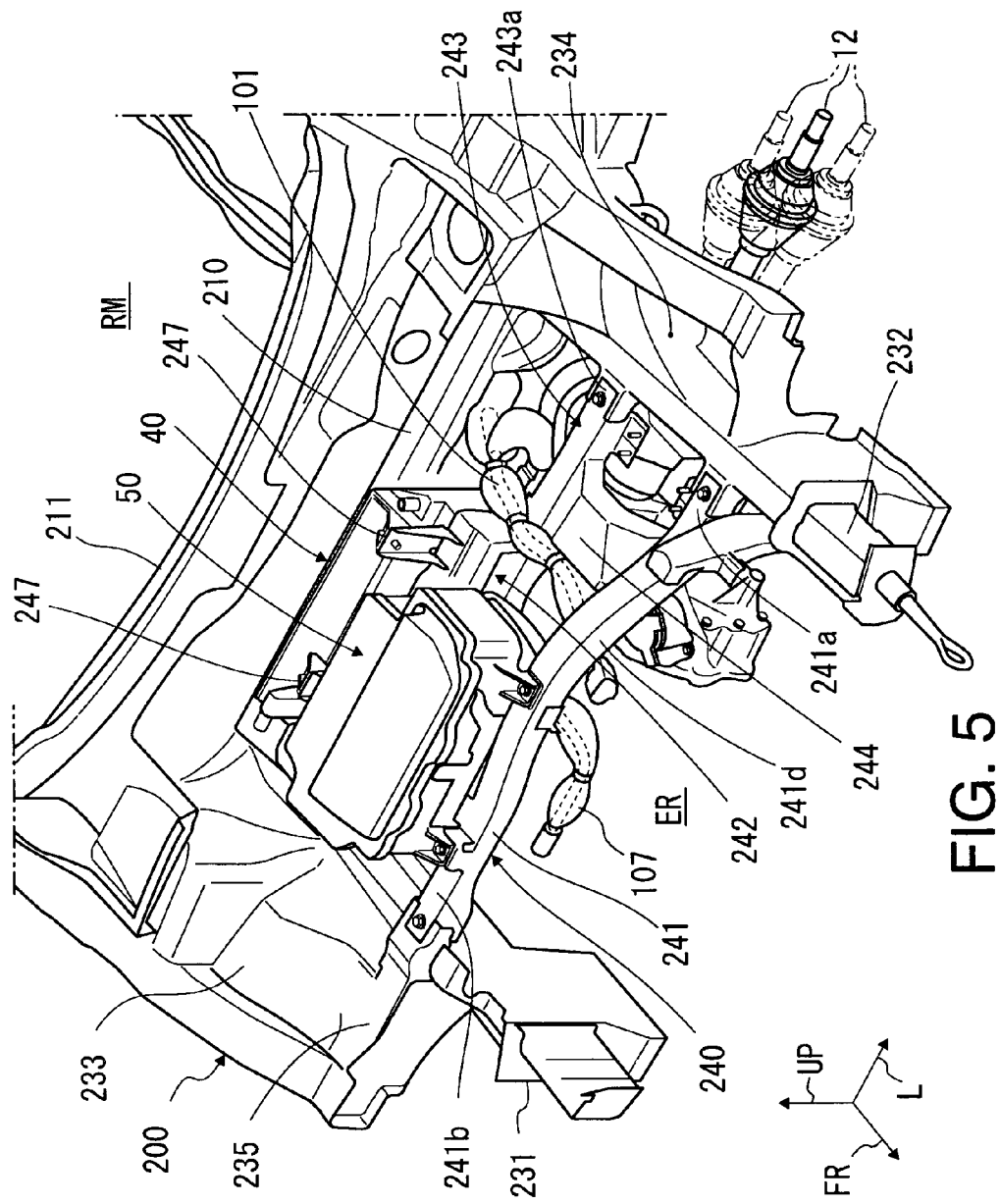
FIG. 5 is a top, front, left side perspective view of the arrangement of the main constituent features inside the motor room of the electric vehicle component mounting arrangement in accordance with the first embodiment.
Figure 6:
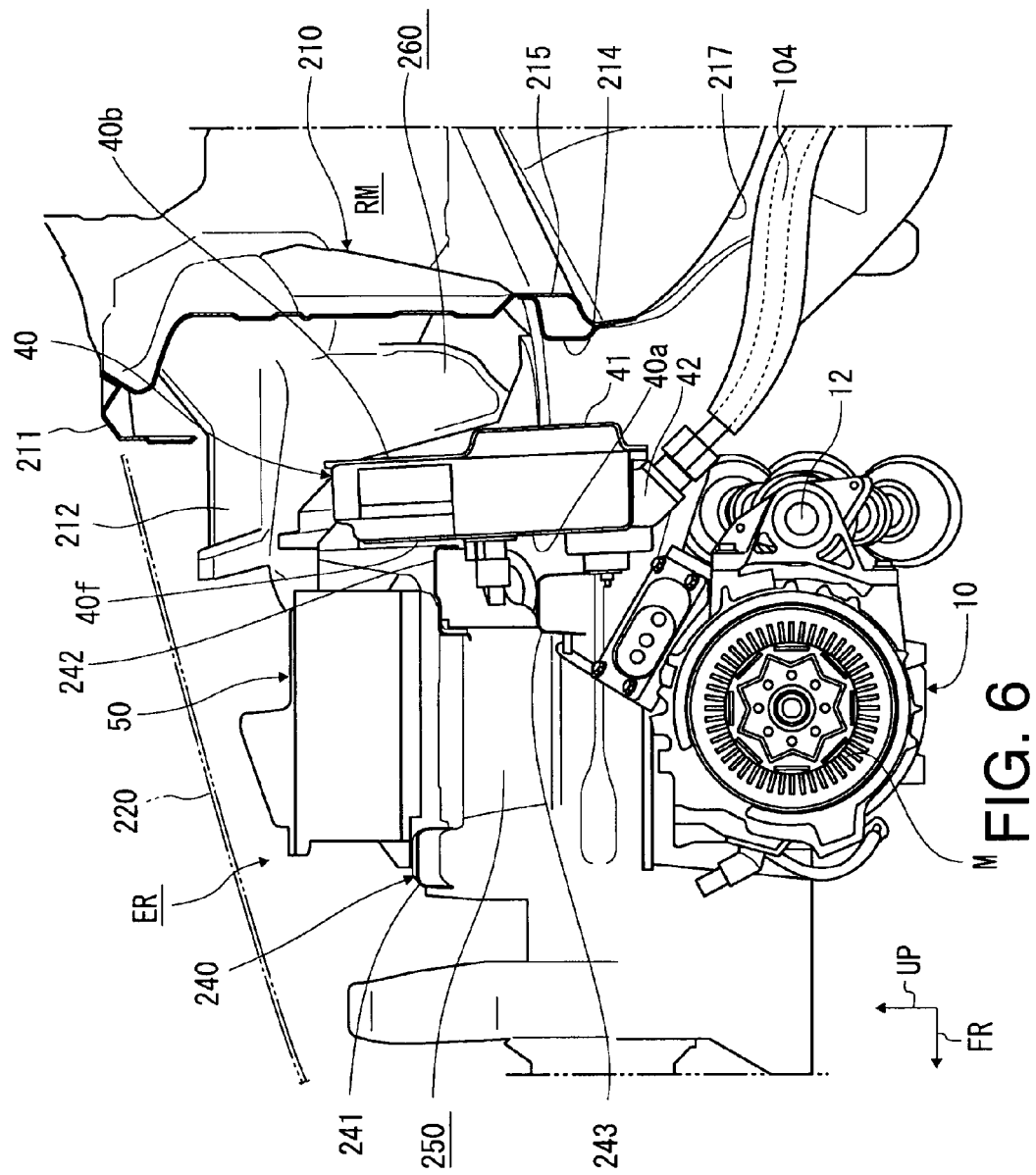
FIG. 6 is a longitudinal cross sectional view of the arrangement of the main constituent features inside the motor room of the electric vehicle component mounting arrangement in accordance with the first embodiment.

As shown in FIGS. 5 and 6, the motor unit 10, the converter 40 and the inverter 50 are arranged in a motor room ER that is provided in a frontward portion of the vehicle. The motor unit 10 mainly includes a motor unit housing 11 (shown in FIG. 3) that houses a motor M (see FIG. 6) and a gear mechanism (not shown). The motor M serves as a drive source that rotates the gear mechanism. The gear mechanism is configured to reduce a rotational speed of the motor M and transfer the rotation of the motor M to left and right axles 12 (see FIG. 5). The motor M can also be used as a generator in addition to serving as a drive source for driving the vehicle.

The drive power supply battery 20 is arranged under a floor of a passenger cabin RM of the vehicle (see FIGS. 5 and 6). The drive power supply battery 20 includes a secondary battery, a control circuit and a cooling device. The secondary battery constitutes a battery module. The control circuit controls charging and discharging of the battery module. In this embodiment the secondary battery is a lithium ion battery, but it is also acceptable to use a nickel cadmium battery, a nickel hydrogen battery, or other rechargeable battery.

The charger 30 is a device that coverts alternating current supplied from an external AC power source, e.g., a household power outlet, into direct current for charging the drive power supply battery 20. The charger 30 is arranged inside a trunk room (not shown) located rearward of the passenger cabin RM (see FIGS. 5 and 6) and connected to both the drive power supply battery 20 and the charging ports 60.

In the illustrated embodiment, the converter 40 is a DC/DC converter. The converter 40 serves to step up the voltage of a current supplied from the drive power supply battery 20. The converter 40 delivers the stepped up current to the inverter 50 when the motor M is operated as a drive motor. Meanwhile, the converter steps down the voltage of a current supplied from the inverter 50 and supplies the stepped down current to the drive power supply battery 20 when the motor M is operated as a generator.

Switching of the inverter 50 is controlled by PWM control such that the inverter 50 converters a direct current supplied from the converter 40 into a three-phase alternating current and feeds the alternating current to the motor M when the motor M is operated as a drive motor. Meanwhile, the inverter 50 is controlled such that it converts a three-phase alternating current supplied from the motor M into a direct current and feeds the direct current to the converter 40 when the motor M is operated as a generator.

Figure 4:
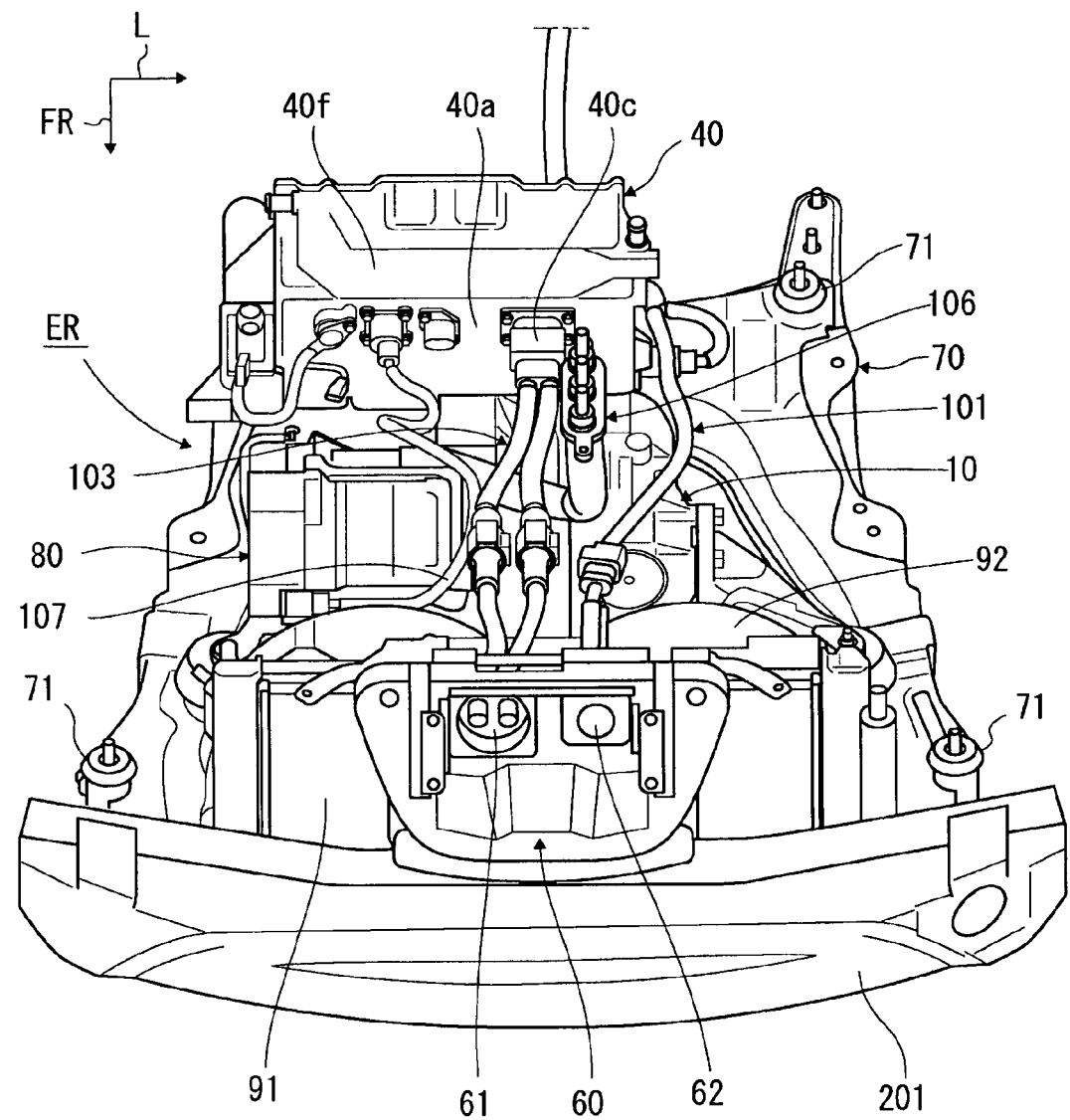
FIG. 4 is a top, front side perspective view of the arrangement of the main constituent features inside the motor room of the electric vehicle component mounting arrangement in accordance with the first embodiment.

As shown in FIG. 4, the charging ports 60 are arranged on a front portion of the vehicle in a position located above a front bumper 20 and substantially midway along a widthwise direction of the vehicle. The charging ports 60 include a high-speed charging port 61 and a household charging port 62. These ports are opened and closed by a lid not shown in the figures. The high-speed charging port 61 is used for connecting to a high-speed charger, i.e., and external high-voltage DC power source (not shown). The high-speed charging port 61 is connected to the converter 40 with a high-voltage DC charging harness 103. The household charging port 62 is used to connect to an external AC power source, e.g., a household outlet supplying 100 to 200 volts. The household charging port 62 is connected to the charger 30 with an AC charging harness 101.

Referring now to FIGS. 5 and 6, the body structure of a frontward portion of the vehicle body will now be briefly explained. FIG. 5 shows a structure of a frontward portion of a vehicle body 200 having a motor room ER arranged in, front of the passenger cabin RM. The motor room ER and the passenger cabin RM are separated by a dash lower panel 210 as shown in FIG. 6. A cowl top panel 211 is welded to an upper portion of the dash lower panel 210. An extension cowl top panel 212 is fastened to the dash lower panel 210. An upper side of the motor room ER is covered with a hold panel 220. As shown in FIG. 5, side members 231 and 232 are arranged on left and right sides of the motor room ER. The side members 231 and 232 extend in the longitudinal direction of the vehicle. A fender panel 233 or 234 is provided integrally on an outward side of each of the side members 231 and 232.

A support structure supporting the motor unit 10, the converter 40 and the inverter 50 will now be explained. The motor unit 10 is supported on the vehicle body 200 in an elastic fashion through a suspension member 70. The converter 40 and inverter 50 are fixed to the vehicle body 200 through a component mounting frame member 240. In the illustrated embodiment, the suspension member 70 is a dual elastic support structure that is used to support the motor unit 10 on the vehicle body 200.

The suspension member 70 is arranged between the motor unit 10 and the vehicle body 200. The suspension member 70 serves as a member, which a vehicle suspension (not shown) is mounted. As shown in FIG. 3, the suspension member 70 is a substantially-square shaped frame made of metal having a box-like cross sectional shape. The four corner portions of the suspension member 70 are elastically supported on a bottom surface of the vehicle body 200 through insulators 71. Each of the insulators 71 includes a shaft and an outer cylinder oriented in a vertical direction of the vehicle and an elastic material disposed between the shaft and the outer cylinder. The suspension member 70 also functions to support a suspension apparatus (not shown). Rubber is used as the elastic material in this embodiment, but it is also acceptable to use silicon, nylon, or another elastic material.

The motor unit 10 is elastically supported on the suspension member 70 in three places through a pair of side mounting members 72 and a rear mounting member 73. The mounting members 72 and 73 are similar to engine mounts in that they prevent vibrations occurring when the motor M is driven from being transmitted to the vehicle body 200. The mounting members 72 and 73 suppress changes to the orientation of the motor unit 10 occurring due to input from a road surface and in reaction to torque generated by the motor M. The two side mounting members 72 elastically support the motor unit 10 at two positions located on the left and right sides of the motor unit 10 and comparatively closer to the frontward side of the motor unit 10. Each of the side mounting members 72 includes a shaft and an outer cylinder oriented in a vertical direction of the vehicle and has the aforementioned elastic material disposed between the shaft and the outer cylinder. The rear mounting member 73 elastically supports a rearward end portion of the motor unit 10 at a position located substantially midway across the motor unit 10 in a widthwise direction of the vehicle. The rear mounting member 73 includes a shaft and an outer cylinder oriented in a horizontal direction of the vehicle. The rear mounting member 73 has its elastic material disposed between the shaft and the outer cylinder.

The motor unit housing 11 is made of aluminum and is electrically grounded to the vehicle body 200.

Figure 7:
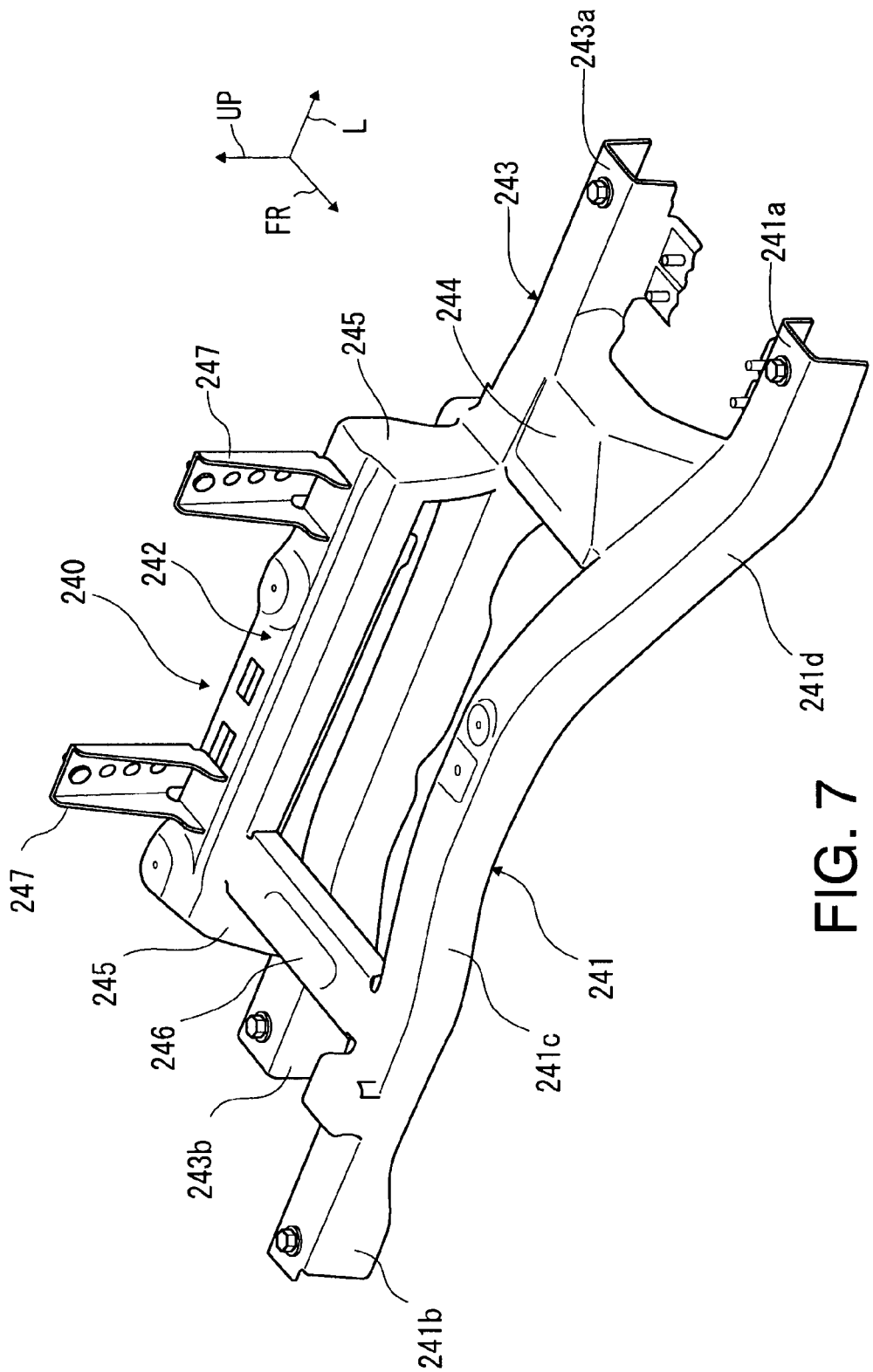
FIG. 7 is a top, front, left side perspective view of the component mounting frame member used in the electric vehicle component mounting arrangement in accordance with the first embodiment.

The support structure provided by the component mounting frame member 240 for supporting the converter 40 and the inverter 50 will now be explained based on FIGS. 5, 7 and 8. As shown in FIG. 7, the component mounting frame member 240 includes a front cross frame member 241, a rear frame member 242 and a lower cross frame member 243. Each of the frame members 241 to 243 has a substantially U-shaped transverse cross section. Each of the frame members 241 to 243 is arranged along a widthwise direction of the vehicle in the motor room ER. Fastening sections 241a, 241b, 243a, and 243b are provided on widthwise end portions of the front cross frame member 241 and the lower cross frame member 243. Each of the fastening sections 241a, 241b, 243a, and 243b has a weld nut (not shown) configured to be fastened to the side member 231 or 232 with a bolt.

The front cross frame member 241 further includes an inverter support section 241c and a curved section 241d. The inverter support section 241c spans rightward from a middle portion of the front cross frame member 241. The inverter support section 241c is arranged at such a height that it supports the inverter 50. The curved section 241d extends leftward from the inverter support section 241c. The curved section 241d curves downward toward the fastening section 241a.

The lower cross frame member 243 has a substantially linear shape. The lower cross frame member 243 is arranged at substantially the same height as the fastening section 241a of the left-hand end of the front cross frame member 241. The lower cross frame member 243 is connected to the curved section 241d of the front cross frame member 241 by an onboard electronics battery support bracket 244. The onboard electronics battery support bracket 244 is configured to support a low-voltage battery (not shown) serving as a power supply for onboard electronics.

The rear frame member 242 is arranged higher than the lower cross member and at substantially the same height as the inverter support section 241c. The rear frame member 242 is connected to the lower cross frame member 243 by two leg brackets 245. The two leg brackets 245 are arranged on left and right end portions of the rear frame member 242. The rear frame member 242 is connected to the front cross frame member 241 by a connecting bracket 246 that extends in the longitudinal direction of the vehicle.

The component mounting frame member 240 is fastened to the vehicle body 200 at the fastening sections 241a, 241b, 243a, and 243b. The fastening sections 243a and 243b on the left and right ends of the lower cross frame member 243 and the fastening section 241a on the left end of the front cross frame member 241 are arranged at the same height as the left and right side members 231 and 232. The fastening sections 243a and 243b of the lower cross frame member 243 and the fastening section 241a of the front cross frame member 241 are fastened to the side members 231 and 232. Meanwhile, the fastening section 241b on the right end of the front cross frame member 241 is arranged higher than the side member 231 in a vertical direction of the vehicle. The fastening section 241b of the front cross frame member 241 is fastened to a support bracket 235 that is welded to the side member 231 and the fender panel 233.

The connecting bracket 246 and the onboard electronics battery support bracket 244 are configured to have such lengths that a distance from the front cross frame member 241 to the rear frame member 242 and the lower cross frame member 243 in a longitudinal direction of the vehicle is substantially the same as a dimension of the inverter 50 oriented in the longitudinal direction of the vehicle.

As shown in FIG. 3, the inverter 50 has an overall shape of a rectangular box. In other words, the inverter 50 is a generally rectangular box having a dimension W1 in the widthwise direction of the vehicle, a dimension L1 in the longitudinal direction of the vehicle, and a dimension H1 in the vertical direction of the vehicle. In the illustrated embodiment, the relative dimensions of the inverter 50 preferably have a dimensional relationship of W1>L1>H1. As shown in FIG. 8, the longitudinal dimension L1 is substantially the same as the distance between the frame members 241 and 242 in the longitudinal direction of the vehicle. The inverter 50 is fastened with bolts to the front cross frame member 241 at two locations (left and right) on a frontward side and to the rear frame member 242 at two locations (left and right) on a rearward side. The inverter 50 is arranged rightward of center in the widthwise direction of the vehicle.

The inverter 50 is supported on the component mounting frame member 240 as explained above, and, as shown in FIG. 6. In particular, the inverter 50 is arranged such that the space 250 exists directly above the motor unit 10 in the vertical direction, with the space 250 being unobstructed between the motor unit 10 and the inverter 50 in the vertical vehicle direction. The inverter 50 is configured and arranged such that substantially no portion thereof protrudes horizontally beyond a region directly above the motor unit 10 in the longitudinal (frontward or rearward) vehicle direction of the vehicle. In particular, a frontward edge position of the inverter 50 is arranged more rearward than a frontward edge position of the motor unit 10 (see FIG. 13). The inverter 50 is also configured and arranged such most of the inverter 50 exists within a region directly above the motor unit 10 in the vehicle widthwise direction of the vehicle such that the inverter 50 is in a generally middle position with respect to the vehicle widthwise direction of the vehicle. The inverter 50 is horizontally separated from the left and right fender panels 233 and 234 (see FIG. 8) in the vehicle widthwise direction.

As shown in FIG. 6, the converter 40 is arranged between the inverter 50 and the dash lower panel 210. The converter 40 is fastened with bolts (not shown) to a pair of converter support brackets 247 (see FIG. 5). Additionally, as shown in FIG. 3, the converter 40 has an overall shape of a thin rectangular box. In other words, the converter 40 is a generally rectangular box having a dimension W2 in a widthwise direction of the vehicle, a dimension L2 in a longitudinal direction of the vehicle, and a dimension H2 in a vertical direction of the vehicle. In the illustrated embodiment, the relative dimensions of the converter 40 preferably have a dimensional relationship of W2>H2>L2. The converter 40 is thus arranged in a vertical, widthwise standing orientation. The converter 40 is arranged and configured such that a topmost edge of the converter 40 is slightly lower than a topmost edge of the inverter 50. Also a bottommost edge of the converter 40 is lower than a bottommost edge of the inverter 50 and slightly higher than the motor unit 10. The bottommost edge of the converter 40 is also arranged to be slightly lower than a bottom edge of the dash lower panel 210. A floor tunnel section 217 (described later) is formed on the dash lower panel 210 at a position rearward of the converter 40. A bottommost edge position of the floor tunnel section 217 is comparatively high. The floor tunnel section 217 serves as a passage for exhaust piping in a vehicle having an internal combustion engine as a power source. The vehicle body 200 of the vehicle depicted in the first embodiment is configured such that it can be used in either an electric vehicle or a vehicle having an internal combustion engine as a power source.

The converter 40 has a forwardly facing front face 40f with a portion that is lower than the rear frame member 242. This portion of the front face 40f of the converter 40 faces the space 250. Thus, this portion of the front face 40f of the converter 40 is hereinafter called the "space facing portion 40a." As shown in FIG. 4, the space facing portion 40a and the charging ports 60 are positioned with respect to the widthwise direction of the vehicle such that they overlap (at least partially aligned) in the longitudinal direction of the vehicle as viewed from either above the vehicle or the front of the vehicle.

Figure 8:
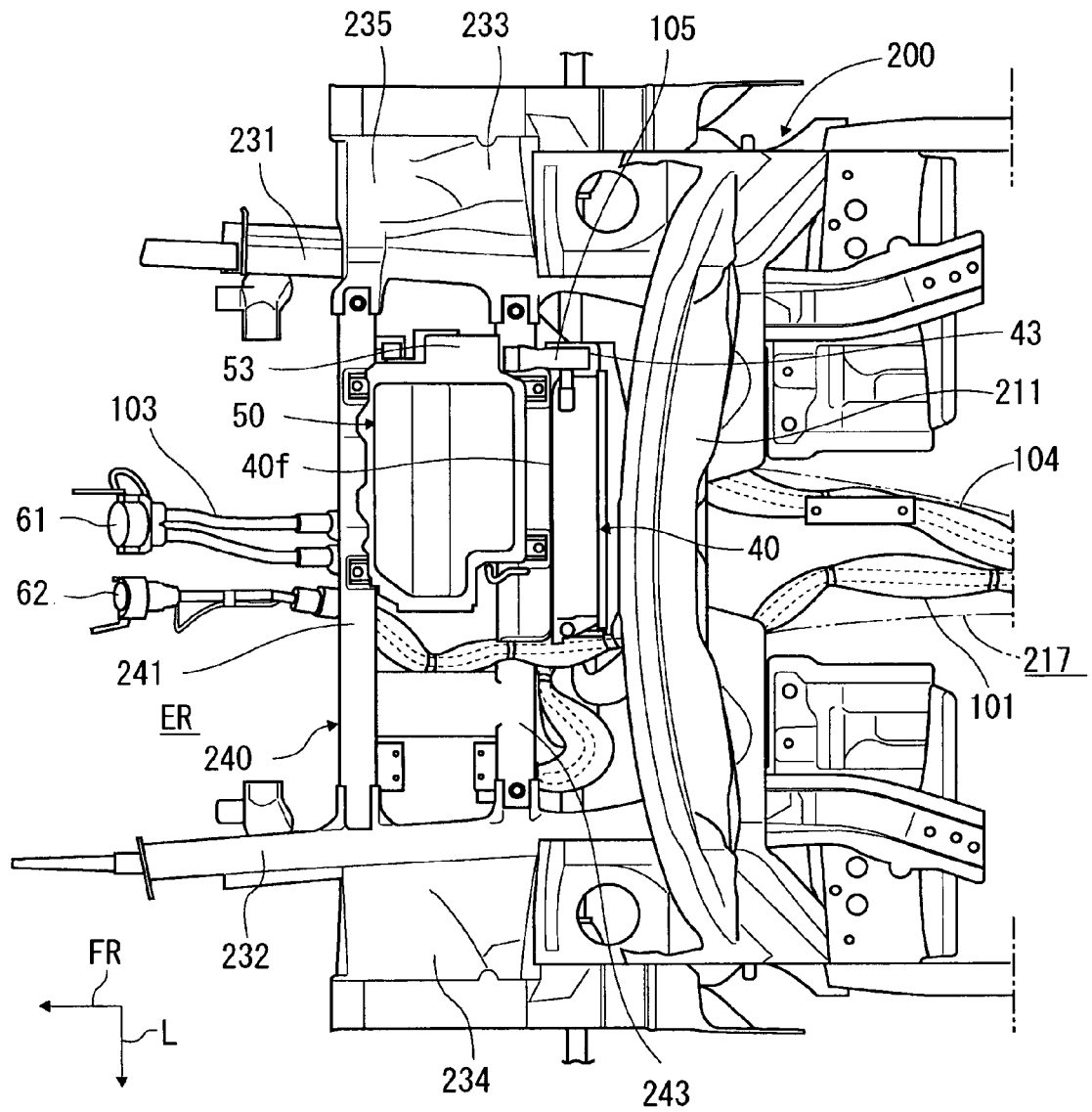
FIG. 8 is a top plan view of the arrangement of the main constituent features inside the motor room of the electric vehicle component mounting arrangement in accordance with the first embodiment.

As shown in FIG. 8, the converter 40 is arranged in a substantially middle position with respect to the widthwise direction of the vehicle such that it overlaps (at least partially aligned) with the floor tunnel section 217 and the drive power supply battery 20 (see FIG. 2) in a longitudinal direction of the vehicle when viewed from above the vehicle.

Figure 9:
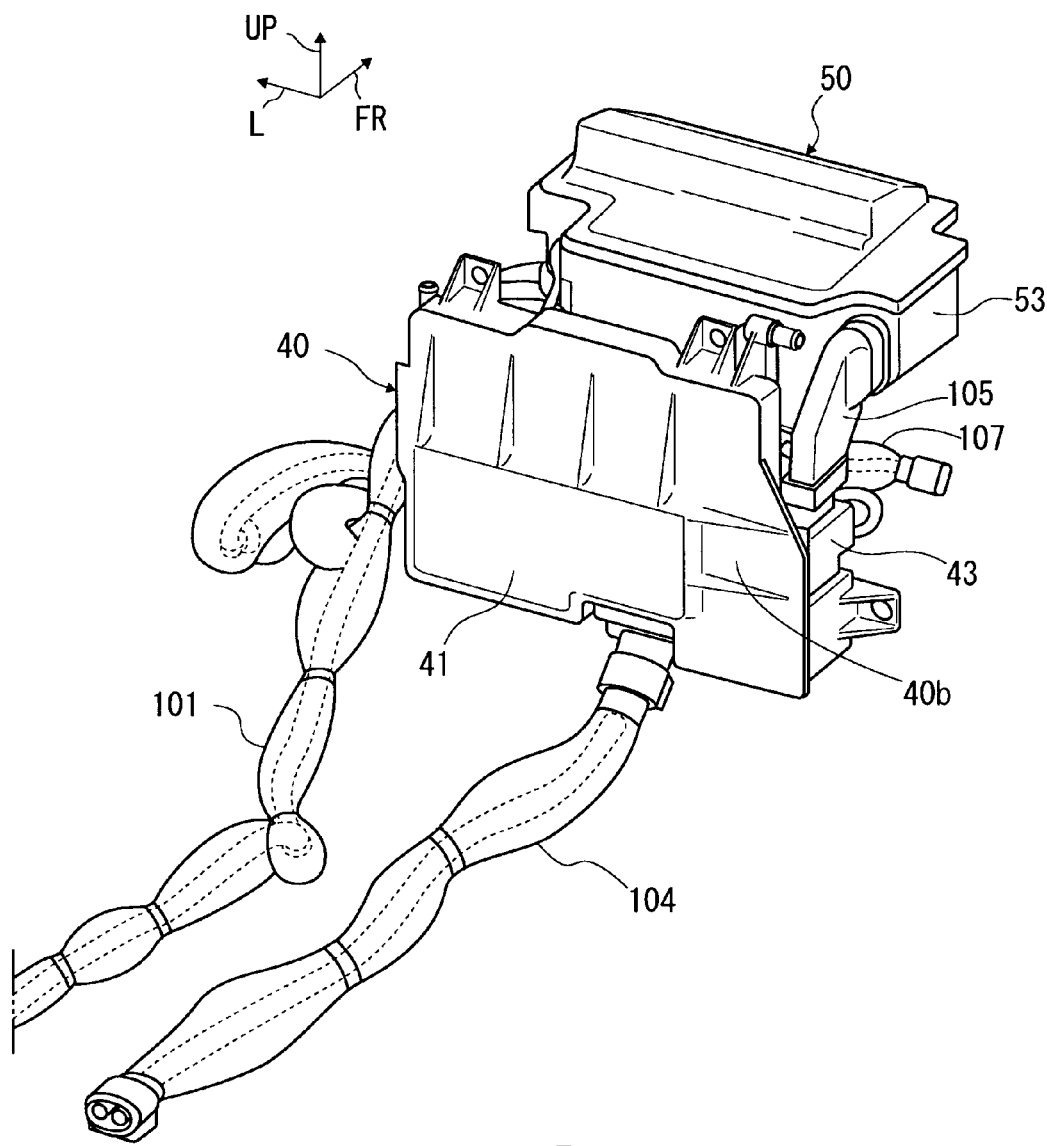
FIG. 9 is a top, rear, right side perspective view of the converter, the inverter and the wiring structure of the electric vehicle component mounting arrangement in accordance with the first embodiment.

A rearward space 260 is provided between the converter 40 and the dash lower panel 210. A planar contact portion 41 is formed in a rearward face 40b of the converter 40 such that a surface of the planar contact portion 41 is substantially parallel to the dash lower panel 210. As shown in FIG. 9, the planar contact portion 41 spans across approximately three-fourths of the total width of the converter 40 in the widthwise direction of the vehicle.

As shown in FIG. 6, a receiving surface 214 arranged and configured to be substantially parallel to the planar contact portion 41 is formed on the dash lower panel 210 in a position facing the planar contact portion 41 in a longitudinal direction of the vehicle. A reinforcing member 215 is joined to the dash lower panel 210 at a position corresponding to the receiving surface 214 such that the dash lower panel 210 is reinforced with a box-like cross sectional structure.

The converter 40 and the inverter 50 are arranged to be spaced horizontally from the left and right fender panels 233 and 234 of the vehicle body 200 in the widthwise direction of the vehicle such that a steering column and a brake master cylinder can be installed in a space between the fender panels 233 and 234 regardless of whether the vehicle is designed to have the steering wheel on the right side or the left side.

The arrangement of other mounted components will now be explained. As shown in FIG. 1, a radiator 91 and a fan apparatus 92 are provided in a frontward space 270 located in a frontward end portion of the motor room ER so as to be arranged side by side in the longitudinal direction of the vehicle. The radiator 91 serves as a condenser for releasing heat from a vehicle air conditioning system (not shown) and/or serving as a radiator of a cooling system (not shown) for cooling such heat producing parts as the converter 40 and the inverter 50. The fan apparatus 92 blows air across the radiator 91. As shown in FIG. 1, a front bumper 201 is arranged in front of the radiator 91.

The wiring connecting the motor unit 10, the drive power supply battery 20, the charger 30, the converter 40, the inverter 50 and the charging port 60 will now be explained. As shown in FIG. 2, the wiring includes an AC charging harness 101, a low-voltage DC charging harness 102, a high-voltage DC charging harness 103 and a low-voltage DC electrical harness 104. The AC charging harness 101 serves to connect the household charging port 62 to the charger 30. The low-voltage DC charging harness 102 serves to connect the charger 30 to the drive power supply battery 20. The high-voltage DC charging harness 103 serves to connect the high-speed charging port 61 to the converter 40. The low-voltage DC electrical harness 104 serves to connect the drive power supply battery 20 to the converter 40. Additionally, as shown in FIG. 9, the wiring includes a high-voltage DC electrical harness 105 and a three-phase AC electrical harness 106. The high-voltage DC electrical harness 105 serves to connect the converter 40 to the inverter 50. The three-phase AC electrical harness 106 serves to connect the inverter 50 to the motor unit 10. The harnesses 101 to 106 are covered with a pliable cover to insulate them and protect them external damage. In this embodiment, the cover is made of a foamed body containing an insulating substance.

Figure 11:
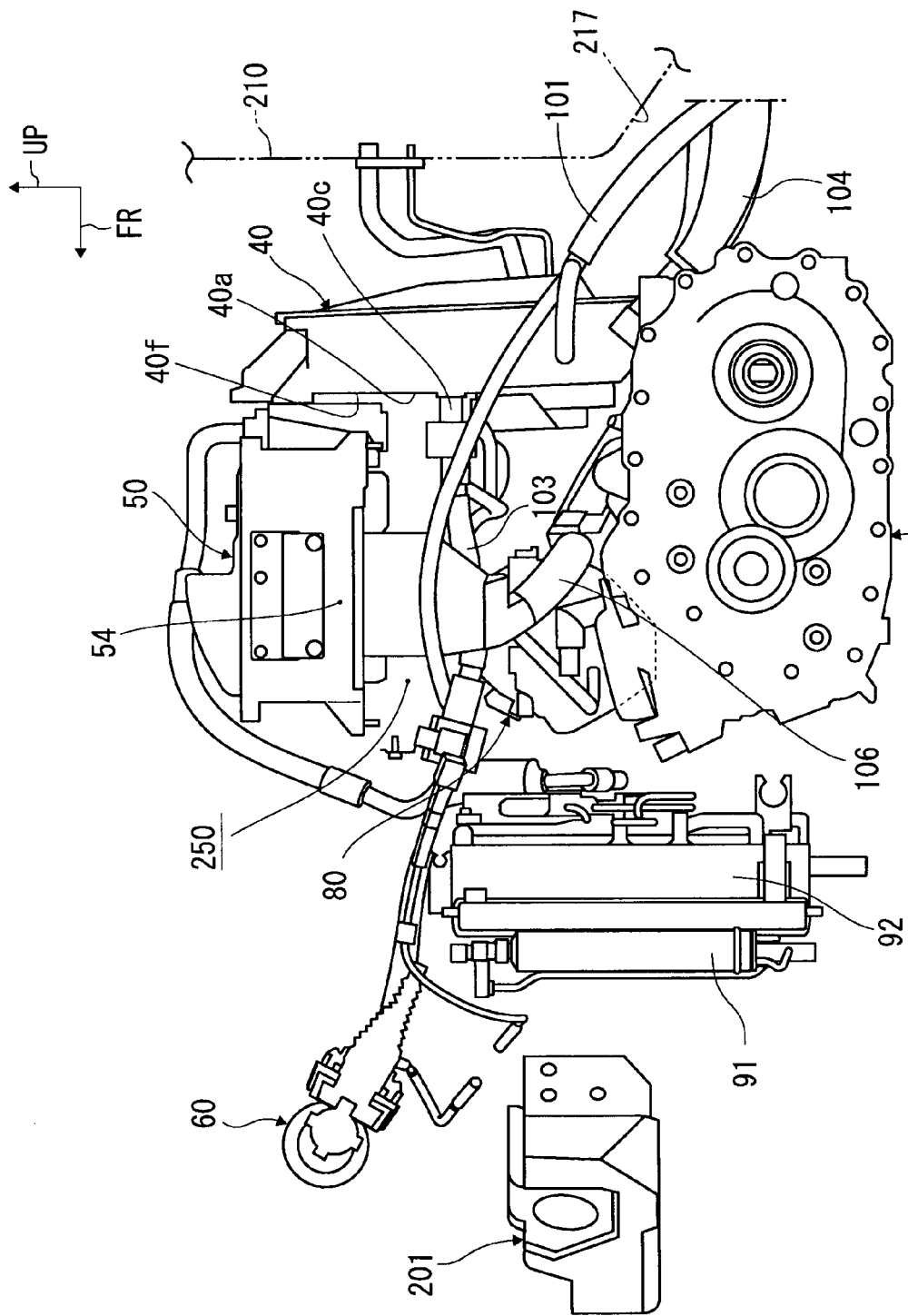
FIG. 11 is a left side elevational view of the arrangement of the main constituent features inside the motor room of the electric vehicle component mounting arrangement in accordance with the first embodiment.
Figure 12:
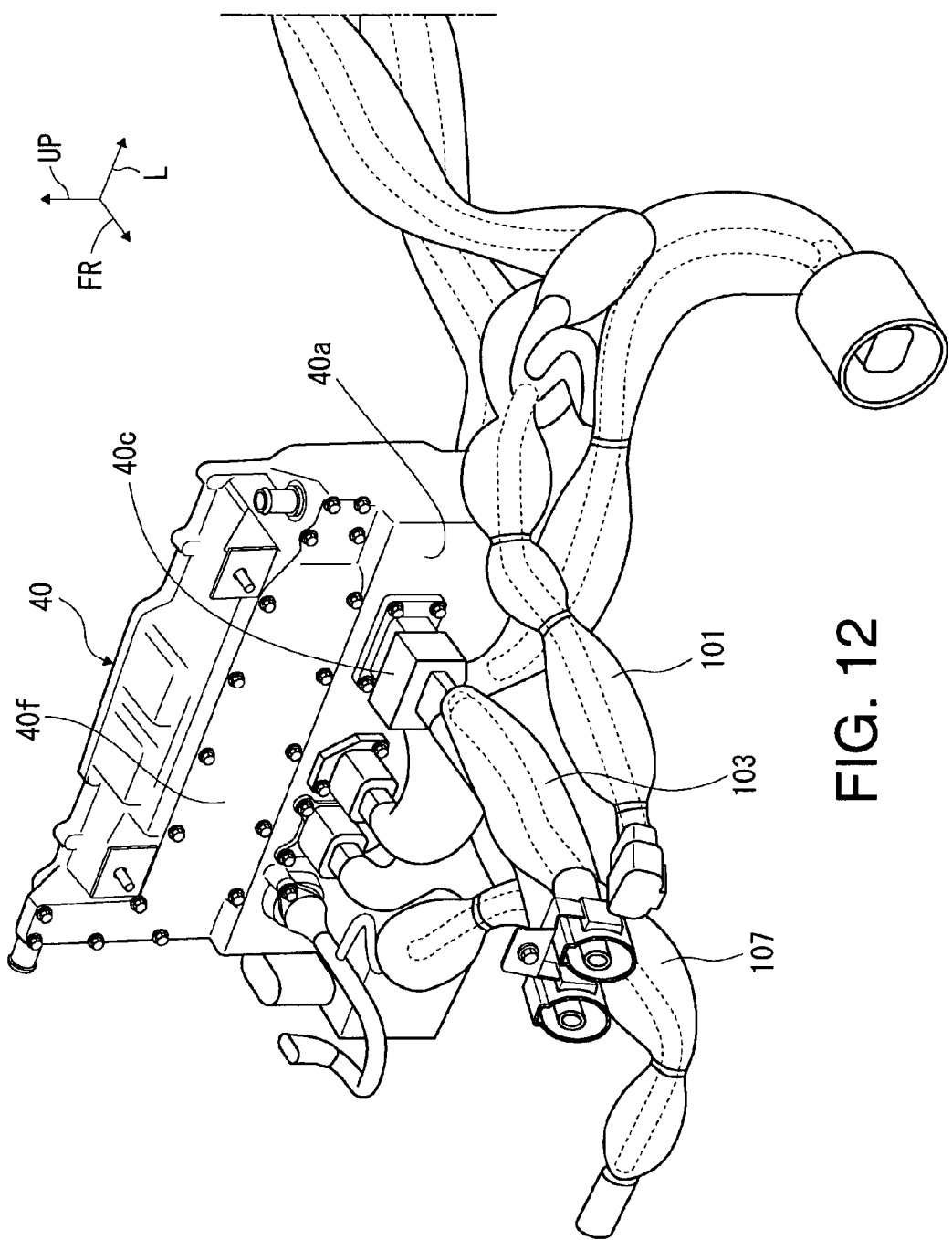
FIG. 12 is a top, front, left side perspective view of the wiring connected to the converter of the electric vehicle component mounting arrangement in accordance with the first embodiment.

The arrangement and structure of each of the harnesses 101 to 106 will now be explained. The AC charging harness 101 is connected between the household charging port 62 arranged on a frontward end of the vehicle and the charger 30 arranged in a rearward portion of the vehicle. As shown in FIG. 1, the AC charging harness 101 spans across the motor room ER in a longitudinal direction of the vehicle, passes through the floor tunnel 217 (see FIG. 11), and passes above the drive power supply battery 20 before reaching the charger 30. As shown in FIG. 11, in this arrangement, the AC charging harness 101 passes next to (left side of) the space 250 between the motor unit 10 and the inverter 50 in the motor room ER. The AC charging harness 101 extends in a generally linear form and diagonally downward toward the floor tunnel section 217 that opens at a lower portion of the dash lower panel 210. As shown in FIGS. 2 and 4, with respect to the widthwise direction of the vehicle, the AC charging harness 101 is displaced in a leftward direction of the vehicle so as to pass by a left side of the converter 40 and then passes through the floor tunnel 217. Since the household charging port 62 is located at a left edge portion of the space facing portion 40a as viewed in the longitudinal vehicle direction, an amount by which the AC charging harness 101 is displaced in a widthwise direction of the vehicle in order to go around the converter 40 is held to a minimum.

The high voltage DC charging harness 103 spans across the space 250 in the longitudinal direction of the vehicle as the high voltage DC charging harness 103 extends from the high-speed charging port 61 toward a charging connector 40c provided on the space facing portion 40a of the converter 40.

As shown in FIG. 11, the charging connector 40c is arranged at the same height as the charging port 60. As shown in FIG. 4, the charging connector 40c is positioned in a widthwise direction of the vehicle such that the charging connector 40c partially overlaps with the charging port 60 as viewed in the longitudinal direction of the vehicle. Thus, the high-voltage DC current charging harness 103 undergoes little vertical displacement in the vertical direction of the vehicle. Also as shown in FIG. 4, the high-voltage DC current charging harness 103 is generally linear with little lateral displacement in a widthwise direction of the vehicle.

As shown in FIG. 6, the low-voltage DC electrical harness 104 is connected to a first converter connector 42 provided on a bottom side of the converter 40. As shown in FIG. 9, the low-voltage DC electrical harness 104 extends diagonally downward from the position where the low-voltage DC electrical harness 104 connects to the converter 40. Form the converter 40, the low-voltage DC electrical harness 104 passes rearward through the floor tunnel 217. The first converter connector 42 of the converter 40 is arranged lower than a bottommost edge of the dash lower panel 210 where the floor tunnel section 217 is formed. The first converter connector 42 and the low-voltage DC electrical harness 104 are arranged lower than the dash lower panel 210 in the vertical direction of the vehicle.

As shown in FIG. 9, one end of the high-voltage DC electrical harness 105 is connected to a second converter connector 43 provided on a right side portion of the converter 40. From the second converter connector 43, the high-voltage DC electrical harness 105 extends diagonally upward and frontward over a right-hand end of the rear frame member 242. The other end of the high-voltage DC electrical harness 105 connects to a first inverter connector 53 provided on a right side portion of the inverter 50 (see FIG. 8).

Figure 13:
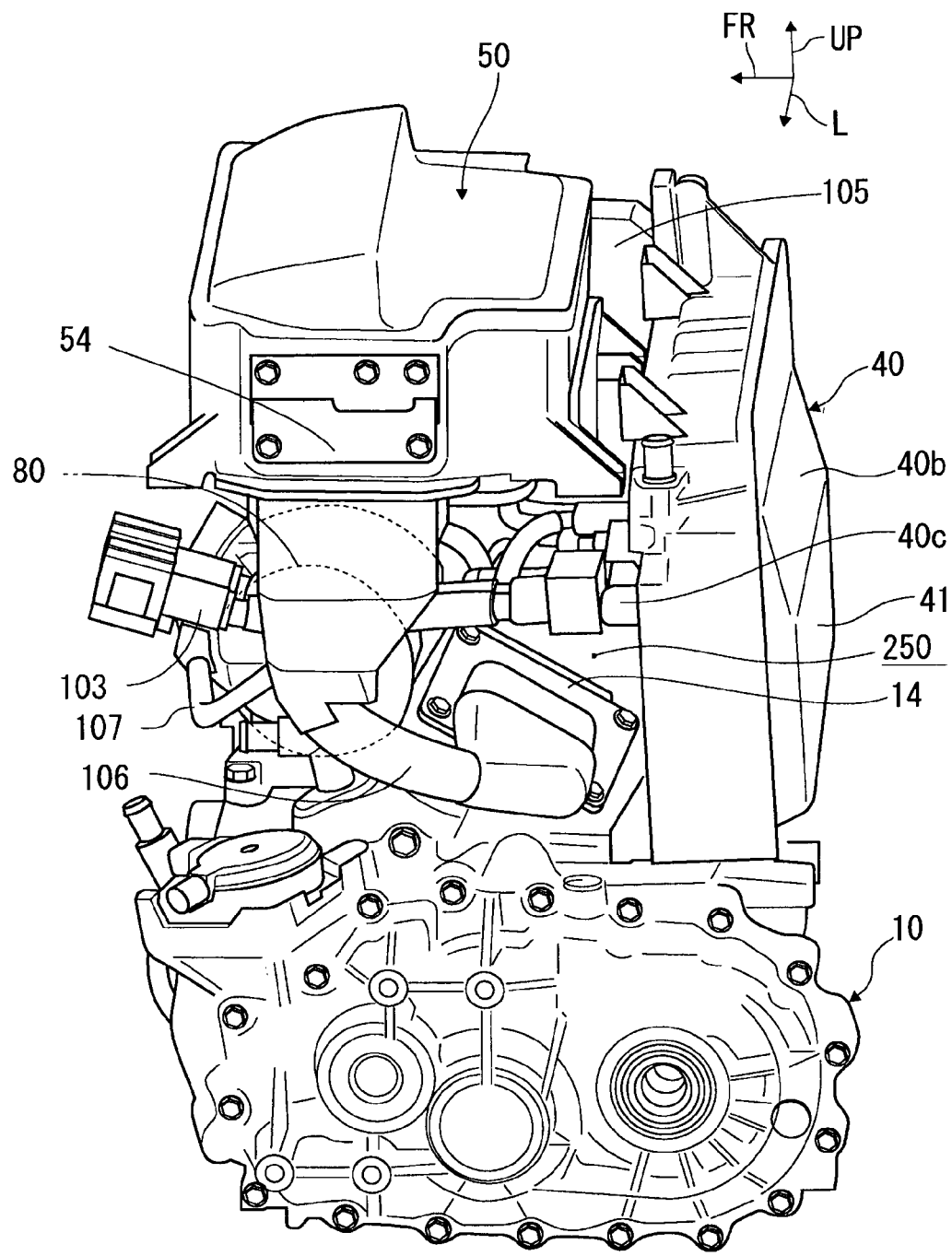
FIG. 13 is a top, left side perspective view of the arrangement of the main constituent features in the motor room of the electric vehicle component mounting arrangement in accordance with the first embodiment.

As shown in FIG. 13, the three-phase AC electrical harness 106 is connected between a second inverter connector 54 and a motor unit connector 14. The second inverter connector 54 is provided on a bottom portion of a left-hand end of the inverter 50. The motor unit connector 14 is provided in a rightward and rearward position on an upper portion of the motor unit housing 11. Thus, the second inverter connector 54 is arranged rearward of the front cross frame member 241. The motor unit connector 14 is arranged rearward of an air conditioning compressor 80 that is fixed to the motor unit housing 11 (described later). The three-phase AC electrical harness 106 is connected to both of the connectors 54 and 14, and passes diagonally through the space 250 between the motor unit 10 and the inverter 50 in such a fashion as to extend from an upper, rightward, frontward portion of the space 250 to a lower, leftward, rearward portion of the space 250. Thus, the phase AC electrical harness 106 has vertical, transverse, and longitudinal directional components with respect to the space 250.

Figure 14:
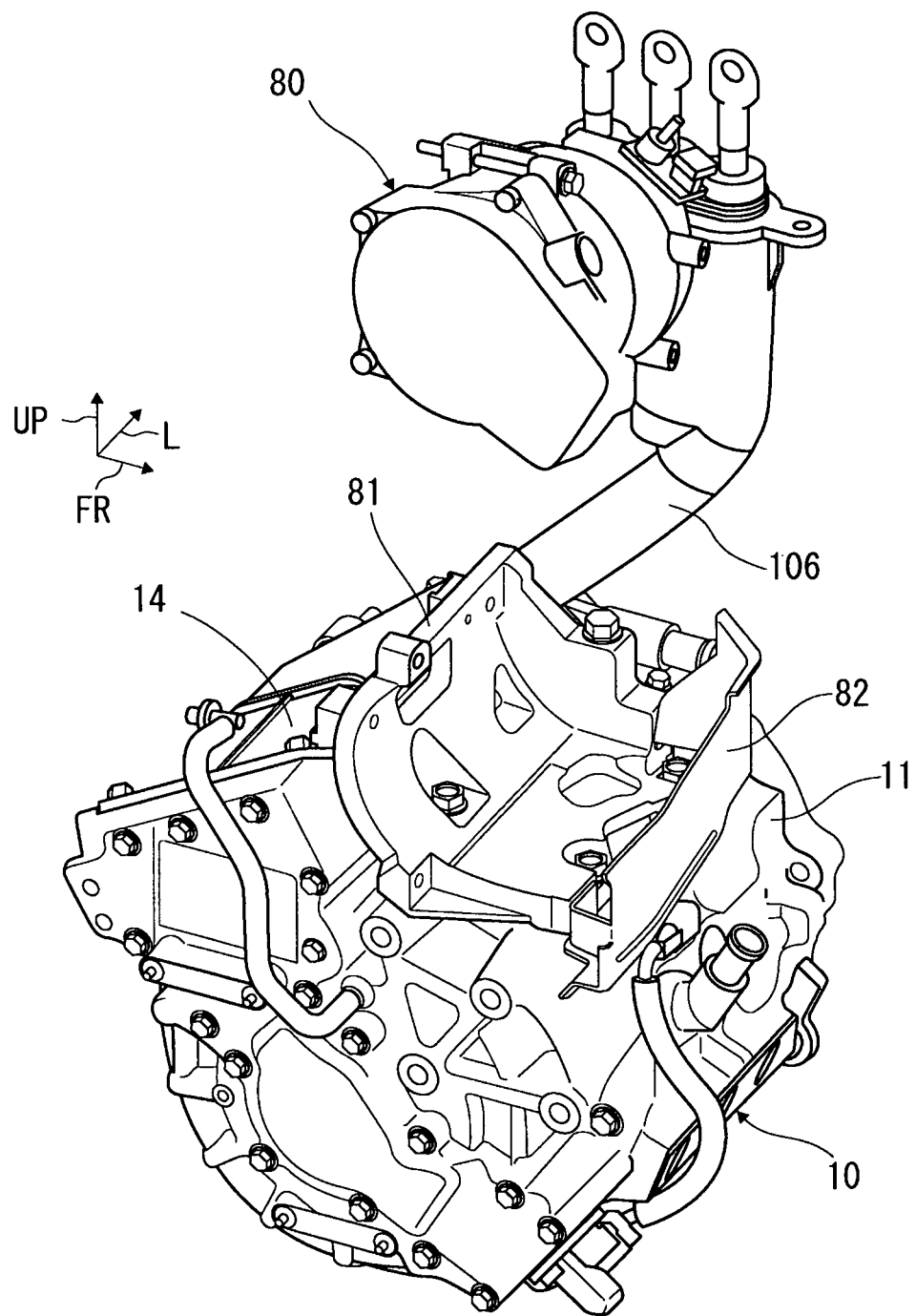
FIG. 14 is a top, front, right side perspective view of the electric vehicle component mounting arrangement with the compressor mounted to the motor unit housing in accordance with the first embodiment.

The compressor 80 is mounted inside the space 250 in a position frontward of the motor unit connector 14 of the motor unit housing 11. The compressor 80 is used to compress a refrigerant of an air conditioning system (not shown in the figures). As shown in FIG. 14, the compressor 80 is attached to the motor unit housing 11 by being fastened to a support bracket 81. The support bracket 81 is fastened to an upper, frontward, leftward portion of the motor unit housing 11. The housing of the compressor 80 and the support bracket 81 are made of aluminum. The support bracket 81 is fastened to the motor unit housing 11 with metal fasteners such that they are grounded to the vehicle body 200 through the motor unit housing 11.

Figure 10:
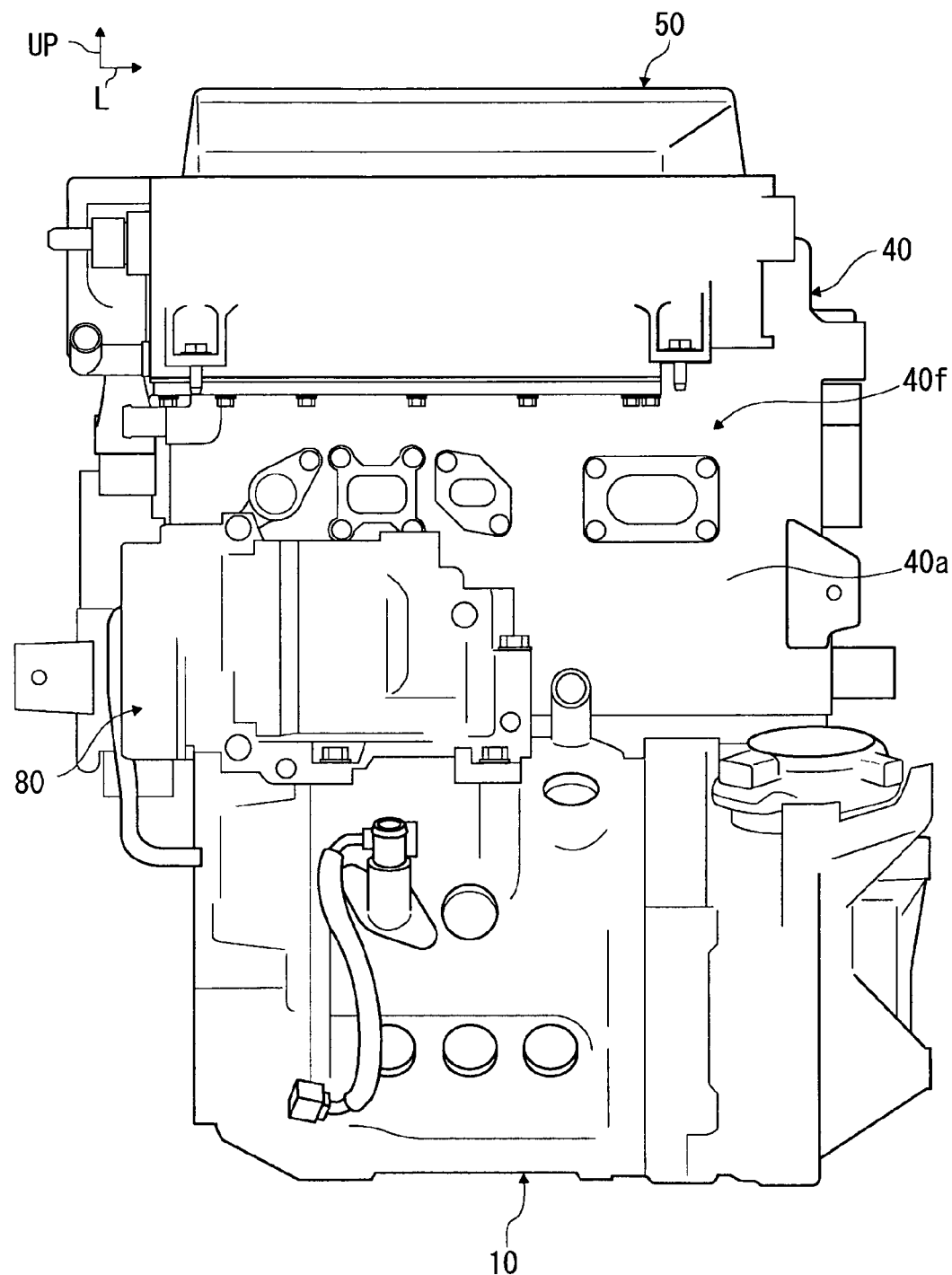
FIG. 10 is a front elevational view of the arrangement of the main constituent features inside the motor room of the electric vehicle component mounting arrangement in accordance with the first embodiment.
Figure 15:
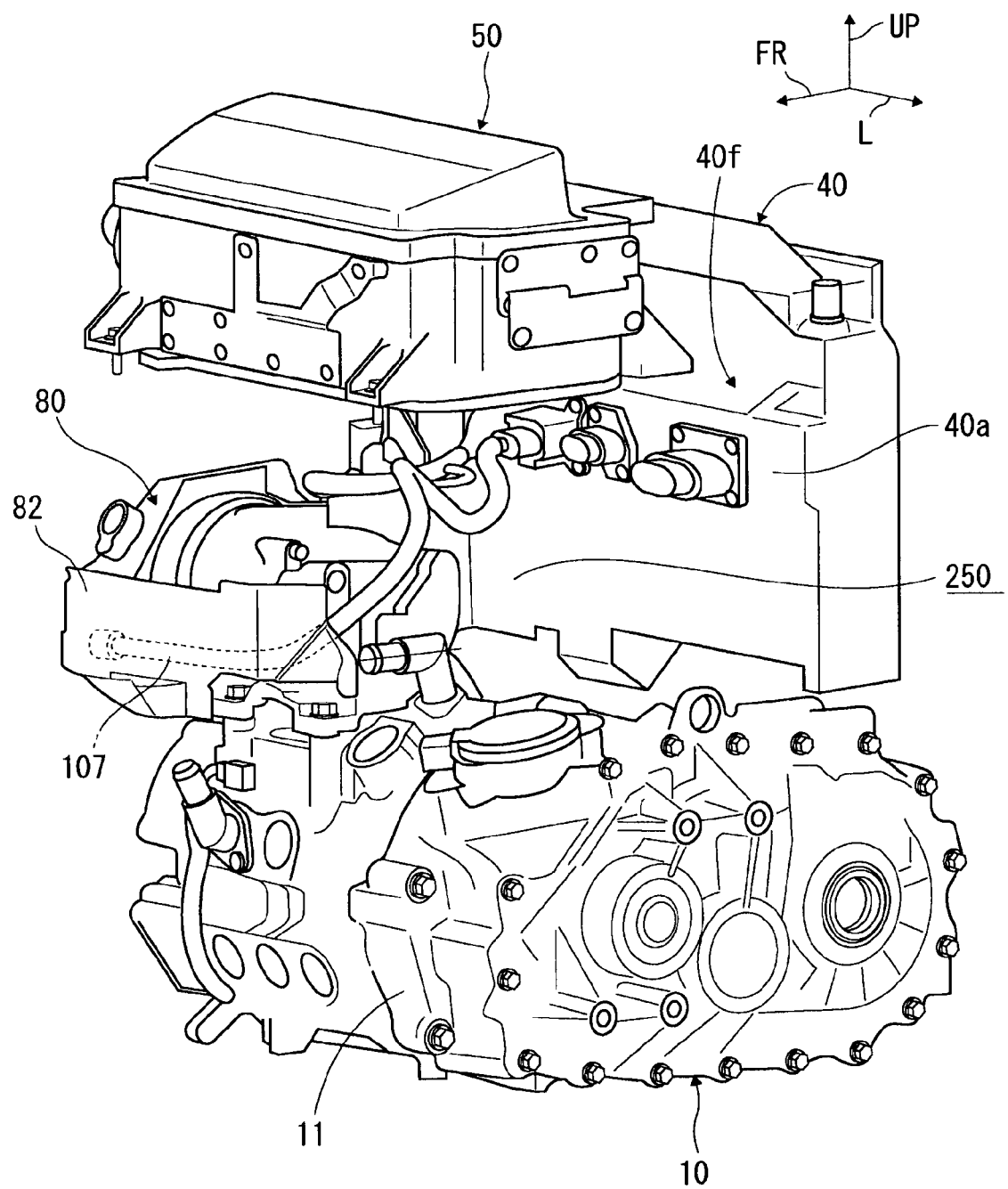
FIG. 15 is a front, left side perspective view of the arrangement of the main constituent features in the motor room of the electric vehicle component mounting arrangement in accordance with the first embodiment.

Additionally, a compressor harness 107 electrically connects the converter 40 to the compressor 80. The compressor harness 107 extends from the converter 40 to the compressor 80 as shown in FIGS. 4 and 15. The compressor harness 107 serves to supply electric current to the compressor 80. The compressor harness 107 is partially covered by a protector 82 having a generally L-shaped cross sectional shape. The protector 82 is arranged and configured to cover a portion of the compressor harness 107. A first portion of the protector 82 is arranged across at least part of a front side of the compressor 80. A second portion of the protector 82 bends around a side of the compressor 80 facing toward a central portion of the vehicle. Thus, the protector 82 covers at least part of a widthwise end of the air conditioning compressor and at least part of the front side of the air conditioning compressor As shown in FIG. 11, the compressor 80 is attached to the motor unit 10 such that a frontward end portion of the compressor 80 is arranged farther rearward than a frontward end portion of the motor unit 10. As shown in FIG. 10, a rightward end portion of the compressor 80 is arranged farther inward (rightward) than a rightward end portion of the motor unit 10. In the first embodiment, the entire cast housing of the compressor 80 is arranged farther inward than the rightward end portion of the motor unit 10. The portion of the compressor 80 that protrudes beyond the rightward end portion of the motor unit 10 is a resin cover in which electrical circuitry is housed.

Operational effects of the first embodiment will now be explained. During diving, the motor unit 10 is supported on the vehicle body 200 through the suspension member 70 with a dual elastic support structure at least partially formed by the mounting members 72 and 73 and the insulators 71. Thus, vibrations generated by the operation of the compressor 80 are doubly prevented from being transmitted to the vehicle body 200 by the dual elastic support structure.

During a front collision, when a front side of the vehicle body 200 undergoes rearward deformation, the radiator 91 and the fan apparatus 92 move rearward. As the vehicle body 200 deforms farther rearward, the motor unit 10, the inverter 50 and the component mounting frame member 240 supporting the motor unit 10 and the inverter 50 also move rearward. When this occurs, the converter 40 also moves rearward along with the component mounting frame member 240. Since a front end portion of the compressor 80 is arranged in substantially the same position as a front end portion of the motor unit 10, the motor unit 10 and the compressor 80 receive an imparted load caused by the rearward deformation of the vehicle body 20 at substantially the same time. Consequently, more deformation of the vehicle body 200 is allowed than with a component mounting structure in which the compressor 80 protrudes beyond the motor unit 10 in a frontward direction and more of the imparted load resulting from the deformation can be absorbed.

Since the load is imparted to the compressor 80 and the motor unit 10 at substantially the same time, it is less likely that the compressor 80 will become detached from the motor unit 10. In other words, the compressor 80 and motor unit 10 can move as an integral unit during a front collision. As a result, the three-phase AC electrical harness 106 is protected by the compressor 80 from contact with portions of the vehicle frame 200 and mounted component parts located frontward of the compressor 80. In this way, the three-phase AC electrical harness 106 is protected from damage.

Additionally, the high-voltage DC electrical harness 105 is arranged on a side portion of the inverter 50 in a position farther rearward than a frontward end portion of the inverter 50 and rearward of the front cross frame member 241. Consequently, the high-voltage DC electrical harness 105 is protected against damage because rearward movement of portions of the vehicle frame 200 and mounted component parts located frontward of the high-voltage DC electrical harness 105 is inhibited by the front cross frame member 241 and the inverter 50.

Since the high-voltage DC electrical harness 105 is arranged farther toward a middle portion of the vehicle than the inverter 50 and a rightward end portion of the support frame, deformation of the vehicle body 200 caused by a load imparted from a right side of the vehicle is born by the inverter 50 and the component mounting frame member 240. As a result, the high-voltage DC electrical harness 105 is protected against damage in the case of a collision occurring on the right side of the vehicle.

The behavior of the converter 40 during a frontal collision of the vehicle will now be explained. When the converter 40 collides against the dash lower panel 210 due to a frontal collision of the vehicle, the planar contact portion 41 of the converter 40 hits against the receiving surface 214 of the dash lower panel 210 in a planar fashion. As a result, the load is more dispersed and the housing of the converter 40 can be better protected against damage than if the converter 40 contacted the dash lower panel 210 at a single point, along a line, or in another localized fashion.

None of the connectors 14, 42, 43, 53, and 54 or the harnesses 101 to 107 is arranged in the rearward space 260 existing between the rearward face 40*b* of the converter 40 and the dash lower panel 210. As a result, the connectors 14, 42, 43, 53, and 54 and the harnesses 101 to 107 can be protected from damage when the rearward face 40*b* of the converter 40 contacts the dash lower panel 210.

Effects exhibited by an electric vehicle component mounting structure according to the first embodiment will now be presented in list form.

(a) The converter 40 is arranged between the inverter 50 and the dash lower panel 210 and close to the drive power supply battery 20. Thus, compared to a structure in which the converter 40 and the inverter 50 are stacked in a vertical direction of the vehicle, the drive power supply battery 20 and the converter 40 can be arranged closer together along a longitudinal direction of the vehicle and the length of the low-voltage DC electrical harness 104 connecting the battery 20 and the converter 40 can be shortened. By shortening the low-voltage DC electrical harness 104, the manufacturing cost and weight thereof can be reduced and the electrical resistance value of the low-voltage DC electrical harness 104 can be suppressed such that an energy loss incurred when electric power is transferred through the low-voltage DC electrical harness 104 can be suppressed. Additionally, the task of arranging the low-voltage DC harness is simplified. Furthermore, compared to a structure in which the converter 40 and the inverter 50 are stacked in a vertical direction of the vehicle, a vertical dimension of the structure can be suppressed and restrictions on the height of the hood panel 220 can be reduced, thereby increasing the degree of design freedom.

The converter 40 is also positioned in a widthwise direction of the vehicle that it overlaps with the drive power supply battery 20 in a longitudinal direction when viewed from above the vehicle, and the low-voltage DC electrical harness 104 connects at a position where the converter 40 and the battery 20 longitudinally overlap each other. Consequently, the low-voltage DC electrical harness 104 can be arranged in a substantially linear form with less displacement in a widthwise direction of the vehicle. For this reason, too, the length of the low-voltage DC electrical harness 104 can be shortened, the manufacturing cost and weight of the low-voltage DC electrical harness 104 can be reduced, an energy loss incurred when electric power is transferred through the low-voltage DC electrical harness 104 can be reduced, and the task of arranging the low-voltage DC electrical harness 104 can be simplified.

(b) The drive power supply battery 20 is arranged below a floor of the cabin RM and the low-voltage DC electrical harness 104 is connected to a first converter connector 42 provided on a bottom side of the converter 40. Thus, the vertical distance spanned by the low-voltage DC electrical harness 104 can be decreased in comparison with a structure in which the first converter connector 42 is provided on a vertically intermediate portion of a top portion of the converter 40. As a result, the length of the low-voltage DC electrical harness 104 can be shortened even further, the manufacturing cost and weight of the low-voltage DC electrical harness 104 can be reduced, and the task of routing and arranging the low-voltage DC electrical harness 104 can be simplified.

(c) The converter 40 is generally shaped like a rectangular box and is arranged in a standing fashion such that a bottom end portion thereof is positioned lower than the inverter 50. Consequently, the first converter connector 42 provided on a bottom portion of the converter 40 can be positioned even lower and a high difference between with respect to the drive power supply battery 20 can be reduced. As a result, the length of the low-voltage DC electrical harness 104 can be shortened, the manufacturing cost, weight, and energy loss of the low-voltage DC electrical harness 104 can be reduced, and the task of arranging the low-voltage DC electrical harness 104 can be simplified. Also, by arranging the converter 40 in a standing orientation, the center of gravity of the converter 40 can be lowered and the weight distribution of the vehicle can be improved. Moreover, the longitudinal dimension of the vehicle can be suppressed and a more compact component arrangement can be achieved.

(d) The converter 40 is arranged in a standing orientation as explained in c) above, and the converter 40 and the inverter 50 are arranged longitudinally such that they overlap vertically with the motor unit 10 in a side view. Thus, even though the converter 40 is arranged rearward of the inverter 50 as explained in a) above, the motor unit 10, the converter 40, and the inverter 50 can be mounted in a compact fashion. Additionally, during a front collision of the vehicle, the converter 40 and the inverter 50 do not bear a collision load before the motor unit 10 and space can be secured for the vehicle body to deform. Similarly, no portion of the converter 40 and no portion of the inverter 50 protrudes beyond the motor unit 10 in a widthwise direction of the vehicle when viewed from above the vehicle. As a result, space can be secured for the vehicle body to deform during a side collision of the vehicle.

(e) The converter 40 and the first converter connector 42 are arranged in the vertical and widthwise directions of the vehicle such that they overlap with a longitudinally forward projection of the floor tunnel section 217. Consequently, the low-voltage DC electrical harness 104 can be arranged to pass through the floor tunnel section 217 in a substantially linear form with little displacement in the vertical and widthwise directions of the vehicle. As a result, the cost of, the weight of, and the energy loss incurred by the low-voltage DC electrical harness 104 can be reduced and the task of arranging the low-voltage DC electrical harness 104 can be simplified.

(f) Since the converter 40 is arranged behind the inverter 50 as explained in a) above, both the converter 40 and the inverter 50 can be arranged to be exposed at an upper portion of the motor room ER. As a result, both the converter 40 and the inverter 50 can be worked on from above and maintenance of the same can be accomplished much more easily than with a component mounting structure in which the converter 40 and the inverter 50 are stacked vertically.

(g) The converter 40 is arranged longitudinally between the inverter 50 and the dash lower panel 210, and the low-voltage DC electrical harness 104 connecting the converter 40 to the drive power supply battery 20 is arranged not to pass between the converter 40 and the dash lower panel 210. Thus, the low-voltage DC electrical harness 104 is not likely to be pinched between the converter 40 and the dash lower panel 210 when the vehicle undergoes a front collision and the vehicle body 200 deforms such that the converter 40 moves rearward. As a result, the low-voltage DC electrical harness 104 can be protected against damage during a frontal collision.

In the first embodiment, the position where the low-voltage DC electrical harness 104 connects to the converter 40 is close to the drive power supply battery 20 and on a bottom side of the converter 40. Thus, the low-voltage DC electrical harness 104 is less likely to be pinched between the converter 40 and other parts than it would be if it were connected to a front surface or a left or right lateral surface of the converter 40. As a result, the low-voltage DC electrical harness 104 can be protected against damage.

(h) Since the converter 40 is provided with a planar contact portion 41 arranged to face toward and be substantially parallel to the dash lower panel 210, the converter 40 and the dash lower panel 210 contact in a planar fashion when they contact each other due to, for example, a collision. As a result, the contact load is more dispersed and the housing of the converter 40 can be better protected against damage than if the converter 40 contacted the dash lower panel 210 at a single point, along a line, or in another localized fashion.

Additionally, since a receiving surface 214 is formed on the dash lower panel 210, the converter 40 and the dash lower panel 210 contact each other in a planar fashion more readily and the effectiveness with which the contact load is dispersed and the converter 40 is protected from damage can be improved.

Since the converter 40 is arranged in a standing orientation and the first converter connector 42 is positioned lower than the inverter 50, the degree to which (amount by which) the first converter connector 42 and the low-voltage DC electrical harness 104 overlap with the dash lower panel 210 in a longitudinal direction of the vehicle can be suppressed in comparison with a structure in which the converter 40 and the inverter 50 are arranged at the same height. As a result, when the converter 40 and the dash lower panel 210 contact each other due to a frontal collision of the vehicle, the first converter connector 42 and the low-voltage DC electrical harness 104 are less likely to be pinched between the dash lower panel 210 and other mounted components and the low-voltage DC electrical harness 104 can be even better protected against damage.

Additionally, in the first embodiment, the first converter connector 42 and the low-voltage DC electrical harness 104 are arranged lower than a top edge of the floor tunnel section 217 such that they do not overlap with the dash lower panel 210 at all in a longitudinal direction of the vehicle when viewed from a side of the vehicle. As a result, the first converter connector 42 and the low-voltage DC electrical harness 104 do not get pinched between the converter 40 and the dash lower panel 210 and the low-voltage DC electrical harness 104 can be protected even more reliably against damage.

(i) The three-phase AC electrical harness 106 connected between the motor unit 10 and the inverter 50 is arranged in the space 250 located frontward of the converter 40 and does not pass between the converter 40 and the dash lower panel 210. Consequently, the three-phase AC electrical harness 106 can be prevented from being damaged due to being pinched between the converter 40 and the dash lower panel 210 during a frontal collision of the vehicle.

Similarly, in the first embodiment, the high-voltage DC electrical harness 105 connected between the converter 40 and the inverter 50 is connected to a second converter connector 43 provided on a side face of the converter 40 and first inverter connector 53 provided on a side face of the inverter 50 such that it does not pass between the converter 40 and the dash lower panel 210. As a result, the high-voltage DC electrical harness 105 can be prevented from being damaged due to being pinched between the converter 40 and the dash lower panel 210 during a frontal collision of the vehicle.

(j) The motor unit 10 is supported on the vehicle body 200 through the suspension member 70 with a dual elastic support structure and the compressor 80 is mounted to the motor unit 10. Thus, an anti-vibration structure for the motor unit 10 and the suspension apparatus also serves as an anti-vibration structure for the compressor 80. As a result, it is not necessary to provide a dedicated anti-vibration structure for the compressor 80 and the component mounting structure as a whole can be made simpler, less expensive, lighter in weight, and more compact than a structure that uses a dedicated anti-vibration structure for the compressor 80. Moreover, since an anti-vibration structure for the motor unit 10 and an anti-vibration structure for the suspension apparatus are used together in series as a dual anti-vibration structure, the vibration prevention performance is improved in comparison to a single anti-vibration structure.

Additionally, the compressor 80 is fastened to the motor unit 10, which is electrically grounded to the vehicle body 200. As a result, the compressor 80 is grounded to the vehicle body 200 through the motor unit 10 and it is not necessary to perform work specifically for grounding the compressor 80. Thus, the overall structure and the assembly work can be simplified.

(k) The main parts of the compressor 80 are arranged rearward of a front end of the motor unit 10 and transversely inward of a rightward end of the motor unit 10. As a result, an amount by which the compressor 80 contacts the vehicle body 200 before the motor unit 10 does during a frontal collision of a side collision of the vehicle can be held to a small amount and the vehicle body 200 can be ensured to deform to a larger degree during a collision (i.e., the vehicle body 200 can be provided with sufficient space to deform and absorb the impact of a collision).

In the first embodiment, the entire cast housing of the compressor 80 is configured and arranged such that it does not protrude beyond the motor unit 10 in a longitudinal direction or a widthwise direction, thereby enabling the aforementioned deformation space for the vehicle body 200 to be maximized. Furthermore, by arranging the compressor 80 in the space 250, the compressor 80 can be arranged in a more compact fashion than if it were arranged outside the space 250.

(l) The motor unit connector 14 for connecting the three-phase AC electrical harness 106 is arranged rearward of the compressor 80 (which is fixed to the motor unit 10) and the space 250 and the three-phase AC electrical harness 106 is arranged inside the space 250. As a result, during a frontal collision of the vehicle, the motor unit housing 11 and the compressor 80 inhibit the vehicle body 200 and mounted components from contacting the motor unit connector 14 and the three-phase electrical harness 106 and the three-phase AC electrical harness 106 can be protected from damage. The second inverter connector 54 where the other end of the three-phase electrical harness 106 is connected is also protected by the front cross member 241. Thus, the compressor 80 and the front cross member 241 can be used to protect the motor unit connector 14, the second inverter connector 54, and the three-phase AC electrical harness 106 and it is not necessary to provide a separate protector for these parts. As a result, the overall structure can be simplified and the cost, weight, and amount of assembly work required can be reduced.

(m) Although the compressor harness 107 connected between the compressor 80 and the converter 40 is arranged to pass in front of the compressor 80, the frontward side of the compressor harness 107 is covered with a protector 82 such that the compressor harness 107 can be protected against damage during a frontal collision of the vehicle. It is also possible to arrange the compressor harness 107 in rear of the compressor 80 such that the compressor harness 107 is protected by the compressor 80 itself and the protector 82 can be eliminated.

(n) The motor unit 10 is elastically supported on the vehicle body 200, the inverter 50 is fixed to the vehicle body 200, and the motor unit 10 and the inverter 50 are vertically separated by a space 250. Thus, the three-phase AC electrical harness 106 connecting the motor unit 10 to the inverter 50 can be made comparatively long and an amount by which the three-phase AC electrical harness 106 is displaced per unit length when the motor unit 10 is displaced with respect to the vehicle body 200 can be held to a small amount. As a result, the three-phase AC electrical harness 106 can be protected against damage resulting from gradual degradation over time caused by displacement of the motor unit 10.

(o) The three-phase electrical harness 106 is connected to a second inverter connector 54 provided on a bottom portion of a left side of the inverter 50 and a motor unit connector 14 provided on a upper rightward portion of the motor unit 10, and the three-phase electrical harness 106 is arranged to span diagonally in a widthwise direction and a vertical direction of the vehicle. Consequently, the total length of the three-phase AC electrical harness 106 can be made longer than if the three-phase AC electrical harness 106 were arranged to span solely in a vertical direction with in a space 250 having the same vertical dimension. As a result, when the motor unit 10 is displaced with respect the vehicle body 200, an amount by which the three-phase AC electrical harness 106 is displaced per unit length in a shear direction can be held to a small amount and the three-phase AC electrical harness 106 can be protected against damage resulting from gradual degradation over time.

(p) The inverter 50 is arranged vertically above the motor unit 10 with the space 250 in-between and in front of the converter 40. The converter 40 is positioned in a vertical direction of the vehicle such that a portion thereof (the space facing portion 40a) overlaps with the space 250 in a longitudinal direction of the vehicle. The charging ports 60 connected to the converter 40 by the high-voltage DC charging harness 103 are arranged toward the front of the vehicle with respect to the inverter 50. Thus, the high-voltage DC charging harness 103 can be arranged in a generally linear form. By arranging the high-voltage DC charging harness 103 in a generally linear form, the task of arranging the high-voltage DC charging harness 103 is simpler than if the high-voltage DC charging harness 103 were to be arranged in a curved form. Moreover, since the total length of a linear form is shorter, the manufacturing cost of, the weight of, and the energy loss incurred by the high-voltage charging harness 103 can be reduced.

The charging ports 60 are arranged frontward of the inverter 50 and rearward of and higher than the front bumper 201. As a result, the work of connecting and disconnecting an external power source to and from the charging ports 60 is easier than if the charging ports 60 were arranged above the converter 40. Moreover, such an unfortunate situation as moving the vehicle while the external power source is still connected can be avoided because the connected state between the external power source and the charging port 60 can be seen from the driver's seat. Moreover, damage to the charging ports 60 can be avoided when the vehicle undergoes a light frontal collision in which the impact can be absorbed by deformation of the front bumper 201 alone.

(q) Since the charging ports 60 and the space facing portion 40a are arranged at similar heights in a vertical direction of the vehicle, the high-voltage DC charging harness 103 can be arranged in a generally linear form with little displacement in a vertical direction of the vehicle. In particular, in the first embodiment, the high-speed charging port 61 and the charging connector 40c provided on the space facing portion 40a of the converter 40 are arranged at the same height and in corresponding positions in a widthwise direction of the vehicle such that they overlap in a longitudinal direction of the vehicle. Thus, the high-voltage DC charging harness 103 connected between the high-speed charging port 61 and the charging connector 40c can be arranged in a linear form with little displacement in a vertical direction and little displacement in a widthwise direction of the vehicle. As a result, the high-voltage DC charging harness 103 can be arranged in an even more linear form, the work of arranging it can be accomplished more easily, and the cost, weight, and energy loss of the high-voltage DC charging harness 103 can be reduced.

In the first embodiment, the converter 40 is arranged in a standing orientation and the vertical and widthwise dimensions of the space facing portion 40a can be made large. As a result, there is a higher degree of freedom with respect to aligning the space facing portion 40a and the charging ports 60 in the vertical and widthwise directions of the vehicle such that they overlap each other in a longitudinal direction of the vehicle as previously mentioned.

The space 250 is used to ensure that the three-phase AC electrical harness 106 has a sufficient length to allow displacement as explained in p) above, to ensure that there is sufficient space to mount the compressor 80 as explained in m) above, and the facilitate the work of arranging the charging harnesses 101 and 103. In this way, the space inside the motor room ER can be used more effectively. Additionally, since the inverter 50 and the motor unit 10 are arranged in the space 250, it is more difficult for deformation of the vehicle body 200 to propagate into the space 250 during a vehicle collision. As a result, the harnesses 101, 103, 106, and 107 arranged to pass through the space 250 are better protected against damage than if they were arranged outside the space 250.

Since the converter 40 and the inverter 50 are not stacked vertically, the space 250 can be provided with a comparatively large vertical dimension between the inverter 50 and the motor unit 10 while suppressing the height of the motor room ER. As a result, the space 250 can be made to have a sufficiently large vertical dimension to utilize the space of the motor room ER effectively as explained above while also suppressing the height of the hood panel 220.

(r) The AC charging harness 101 connected between the household charging port 62 and the charger 30 is arranged to undergo a vertical displacement as it passes through the space 250 and to extend in a generally linear fashion with respect to the widthwise direction of the vehicle between the household charging port 62 and the floor tunnel section 217 (which is aligned with the household charging port 62 in a widthwise direction of the vehicle) except for a portion where the AC charging harness 101 curves around a side edge portion of the converter 40. Thus, the displacements of the AC charging harness 101 in the vertical and widthwise directions of the vehicle are suppressed and the harness 101 is arranged in a generally linear form. As a result, the length of the AC charging harness 101 can be shortened, the cost, weight, and energy loss of the same can be reduced, and the work of arranging the harness 101 can be accomplished more easily. Additionally, since the household charging port 62 is arranged facing a left-hand edge portion of the converter 40, the widthwise displacement of the AC charging harness 101 at the portion where it curves around the converter 40 can be kept comparatively small.

While only selected embodiments have been chosen to illustrate the present invention, it will be apparent to those skilled in the art from this disclosure that various changes and modifications can be made herein without departing from the scope of the invention as defined in the appended claims. For example, although in the first embodiment a storage battery is used as the drive power supply battery, it is also possible to use a capacitor or other device capable of storing electricity.

Although in the first embodiment the motor room ER is arranged in front of the cabin RM, it is also acceptable to arrange it rearward of the cabin RM. In such a case, it is acceptable to provide a motor in both the front and rear of the vehicle instead of only the front or the rear.

Although in the first embodiment the converter 40 and the inverter 50 are mounted separately, it is also acceptable for the converter 40 and the inverter 50 to be arranged in a single housing and mounted as a single unit.

Although in the first embodiment the converter 40 is arranged in a standing orientation, it is acceptable for the converter 40 not to be arranged in a standing orientation. The effects resulting from shortening the low-voltage DC electrical harness 104 can be obtained by arranging the converter 40 closer to a partitioning wall than the inverter 50. Also, the effects resulting from shortening the low-voltage DC electrical harness 104 can be obtained even if the low-voltage DC electrical harness 104 is not connected on a bottom side of the converter. Also, although in the first embodiment the converter 40 is arranged in a standing orientation in which the second largest dimension is oriented in a vertical direction of the vehicle, it is also acceptable for the converter 40 to be arranged such that the longest dimension is oriented in a vertical direction.

Although in the first embodiment the drive power supply battery is arranged below a floor of the cabin RM, the invention is not limited to such an arrangement and it is acceptable to arrange the drive power supply battery in another position so long as it is outside the motor room on the cabin side of the motor room. For example, the drive power supply battery could be arranged in a trunk room or between a seat of the cabin and a trunk room.

Thus, the foregoing descriptions of the embodiments in accordance with the present invention are provided for illustration only, and not for the purpose of limiting the invention as defined by the appended claims and their equivalents.

What is claimed is:

1. A vehicle component mounting arrangement comprising:
   a motor serving as a vehicle drive source;
   an inverter electrically connected to the motor to supply a drive current to the motor, the inverter being vertically arranged above the motor in a vertical direction of a vehicle;
   a converter arranged inside a motor room of a vehicle; and
   a drive power supply battery electrically connected to the converter with an electrical harness, the drive power supply battery being arranged outside the motor room on a side of the motor room that is closer to a vehicle cabin,
   the converter being further arranged between the inverter and the drive power supply battery with respect to a longitudinal direction of the vehicle, and the converter having an overall rectangular box shape that is arranged in a standing orientation with a shortest dimension of the rectangular box shape extending in the longitudinal direction of the vehicle, and another dimension of the rectangular box shape extending in the vertical direction of the vehicle, and a bottommost end of the rectangular box shape being positioned lower than a bottommost end of the inverter with respect to the vertical direction of the vehicle.

2. The vehicle component mounting arrangement as recited in claim 1, wherein
   the drive power supply battery is arranged below a floor of the vehicle cabin; and
   the electrical harness is connected to a bottom side of the converter.

3. The vehicle component mounting arrangement as recited in claim 1, wherein
   the inverter and the converter are arranged with respect to the longitudinal direction of the vehicle such that the inverter and the converter overlap with a motor housing that houses the motor when viewed from above the vehicle.

4. The vehicle component mounting arrangement as recited in claim 2, wherein
   the inverter and the converter are arranged with respect to the longitudinal direction of the vehicle such that the inverter and the converter overlap with a motor housing that houses the motor when viewed from above the vehicle.

5. The vehicle component mounting arrangement as recited in claim 2, wherein
   the electrical harness is connected to the converter at a position that is lower than a partitioning wall separating the motor room and the vehicle cabin.

6. The vehicle component mounting arrangement as recited in claim 5, wherein
   the converter includes a planar contact portion that faces the partitioning wall with the planar contact portion being parallel to the partitioning wall.

7. The vehicle component mounting arrangement as recited in claim 1, wherein
   the electrical harness is connected to the converter at a position that is lower than a partitioning wall separating the motor room and the vehicle cabin.

8. The vehicle component mounting arrangement as recited in claim 7, wherein
   the converter includes a planar contact portion that faces the partitioning wall with the planar contact portion being parallel to the partitioning wall.

9. The vehicle component mounting arrangement as recited in claim 3, wherein
the electrical harness is connected to the converter at a position that is lower than a partitioning wall separating the motor room and the vehicle cabin.

10. The vehicle component mounting arrangement as recited in claim 9, wherein
the converter includes a planar contact portion that faces the partitioning wall with the planar contact portion being parallel to the partitioning wall.

11. A vehicle component mounting arrangement comprising:
a motor serving as a vehicle drive source;
an inverter electrically connected to the motor to supply a drive current to the motor, the inverter being vertically arranged above the motor in a vertical direction of a vehicle;
a converter arranged inside a motor room of a vehicle; and
a drive power supply battery electrically connected to the converter with an electrical harness, the drive power supply battery being arranged outside the motor room on a side of the motor room that is closer to a vehicle cabin,
the converter being further arranged between the inverter and the drive power supply battery with respect to a longitudinal direction of the vehicle, and the electrical harness being connected to the converter at a position that is lower than a partitioning wall separating the motor room and the vehicle cabin.

12. The vehicle component mounting arrangement as recited in claim 11, wherein
the converter includes a planar contact portion that faces the partitioning wall with the planar contact portion being parallel to the partitioning wall.

* * * * *